United States Patent [19]

Crossman et al.

[11] Patent Number: 5,664,057
[45] Date of Patent: Sep. 2, 1997

[54] FIXED BIT RATE SPEECH ENCODER/ DECODER

[75] Inventors: Antony Henry Crossman, Swampscott; Brant Martin Helf, Melrose, both of Mass.

[73] Assignee: PictureTel Corporation, Andover, Mass.

[21] Appl. No.: 416,525

[22] Filed: Apr. 3, 1995

Related U.S. Application Data

[63] Continuation of Ser. No. 88,309, Jul. 7, 1993, abandoned.
[51] Int. Cl.$^6$ ........................................ G10L 7/04
[52] U.S. Cl. .................................. 704/229; 704/230
[58] Field of Search .................... 395/2, 2.1, 2.14, 395/2.15, 2.38, 2.39; 381/36, 37, 40

[56] References Cited

U.S. PATENT DOCUMENTS

| | | | |
|---|---|---|---|
| 4,538,234 | 8/1985 | Honda et al. | 364/513.5 |
| 4,696,040 | 9/1987 | Doddington et al. | 381/46 |
| 4,751,736 | 6/1988 | Gupta et al. | 381/31 |
| 4,926,482 | 5/1990 | Frost et al. | 381/31 |
| 4,949,383 | 8/1990 | Koh et al. | 381/31 |
| 4,964,166 | 10/1990 | Wilson | 381/34 |
| 4,965,830 | 10/1990 | Barham et al. | 381/31 |
| 4,991,213 | 2/1991 | Wilson | 381/34 |
| 5,040,217 | 8/1991 | Brandenburg et al. | 381/47 |
| 5,042,069 | 8/1991 | Chhatwal et al. | 381/31 |
| 5,150,387 | 9/1992 | Yoshikawa et al. | 395/2.38 |
| 5,317,672 | 5/1994 | Crossman et al. | 395/2.38 |
| 5,479,561 | 12/1995 | Kim | 395/2.38 |

OTHER PUBLICATIONS

Max, "Quantizing for Minimum Distortion", IRE Transactions on Information Theory, March, 1960, pp. 7–12.
Darragh, "Subband and Transform Coding of Images", May, 1989, Dissertation of John Darragh, U.C.L.A. Dept. of Electrical Engineering, Report No. UCLA-ENG-89-53 pp. 1–165.

Atal et al., "Predictive Coding of Speech Signals and Subjective Error Criteria," IEEE Transactions on Acoustics, 1979, vol. ASSP-27, pp. 247–254.
Zelinski et al., "Adaptive Transform Coding of Speech Signals", IEEE Transactions on Acoustics, vol. ASSP-25, 1977, pp. 299–309.
Huang et al., "Block Quantization of Correlated Gaussian Random Variables", IEEE Transactions on Communications Systems, Sep., 1963, pp. 289–296.
Tribolet et al., "Frequency Domain Coding of Speech", IEEE Transactions on Acoustics, vol. ASSP-27, No. 5, 1979, pp. 512–530.

*Primary Examiner*—Allen R. MacDonald
*Assistant Examiner*—Michael N. Opsasnick
*Attorney, Agent, or Firm*—Fish & Richardson P.C.

[57] ABSTRACT

The invention features a method of transmitting a digital signal which includes frames of frequency coefficients arranged in bands. For each frame, the method includes generating a spectral estimate of the energy in each of the bands, a class value that corresponds to the energy in a band relative to the average energy in the other bands for each of the bands, and a step size for each of the frequency coefficients based on the spectral estimate for the corresponding band. The step size varies with the energy in the band so that the step size for a frequency coefficient in a band having relatively high energy is larger than the step size for a frequency component in a band having relatively low energy. The frequency coefficients are then quantized, based on the relationship between the value of the frequency coefficient, the corresponding class value, and the corresponding step size, to produce quantized frequency coefficients. These quantized frequency coefficients are then encoded based on the class values to produce encoded quantized frequency coefficients. Thereafter, the class values are iteratively modified and the steps of generating class values and step sizes and quantizing and encoding the frequency coefficients are repeated until the number of bits that represent the encoded quantized frequency coefficients is optimized. Finally, the encoded quantized frequency coefficients are transmitted.

5 Claims, 8 Drawing Sheets

FIXED BIT RATE SPEECH ENCODER/DECODER

This application is a continuation of U.S. application Ser. No. 08/088,309, filed Jul. 7, 1993, now abandoned.

REFERENCE TO APPENDIX

An attached appendix contains Huffman encoder tables.

BACKGROUND OF THE INVENTION

The invention relates to the encoding and subsequent decoding of audio signals transmitted over a communications channel.

The combined bandwidth of audio and video signals to be transmitted in teleconferencing and videoconferencing applications often exceeds the bandwidth of the available communications channel. As a result, techniques have been developed to compress the audio and video signals so that they can be transmitted using less bandwidth without significant degradation in signal quality.

To allow comparison of different compression approaches, various standards organizations have developed guidelines for acceptable signal quality. One such standard is the international seven kilohertz audio standard, CCITT recommendation G.722, which provides quality guidelines for digital transmission of seven kilohertz audio signals at a transmission rate of 48,000 bits per second.

SUMMARY OF THE INVENTION

The invention provides a compression scheme that offers equivalent quality to that of CCITT recommendation G.722, but at a transmission rate of only 24,000 bits per second, and therefore provides for more efficient use of available digital transmission bandwidth. In videoconferencing applications, this reduction in the transmission rate required for audio transmission means that more transmission bandwidth is available for transmission of video images, which thereby improves the video quality and overall videoconferencing system performance.

In one aspect, generally, the invention features a method of transmitting a digital signal where the digital signal includes frames of frequency coefficients arranged in bands. For each frame, spectral estimates of the energy in each of the bands, and step sizes for each of the frequency coefficients based on the spectral estimate for the corresponding band are generated. The step sizes vary with the spectral estimates so that the step size for a frequency coefficient in a band having relatively higher energy is larger than the step size for a frequency coefficients in a band having relatively lower energy. The frequency coefficients are then quantized based on the relationship between the magnitude of the frequency coefficients and the corresponding step size to produce quantized frequency coefficients that are subsequently transmitted.

By varying the step size for a frequency coefficient with the energy in the corresponding frequency band, the invention places more coding distortion in high energy bands, where the higher signal energy is better able to mask the distortion, than in low energy bands, where the distortion would be less easily masked. As a result, a listener does not readily perceive the distortion.

In preferred embodiments, the quantized frequency coefficients are encoded using an entropy coding scheme in which consecutive quantized frequency coefficients having values of zero are jointly encoded. Typically, this coding scheme is based on Huffman coding.

Generally, class values that correspond to the energy in a frequency band relative to the average energy in the other frequency bands of a frame are also generated. These class values are used in generating the quantized frequency coefficients. Also, for frequency bands having a class value of zero, no quantized frequency coefficients are generated or transmitted. Class values are also used in encoding the quantized frequency coefficients.

In another aspect, generally, the invention features the use of a feedback mechanism to modify the class values and thereby modify the number of bits needed to represent the encoded quantized frequency coefficients. For a given frame, the class values, which control, in part, the number of bits needed to represent the encoded quantized frequency coefficients, are iteratively modified until an optimum number of bits are obtained or an iteration count is exceeded.

This feedback mechanism maintains the number of bits needed to represent the encoded quantized frequency coefficients at an optimum value. In doing so, the feedback mechanism ensures that the encoder makes maximum use of the available digital transmission bandwidth in transmitting the encoded coefficients without exceeding this bandwidth. By maximizing use of the available bandwidth, the encoder obtains the highest quality audio signal for that bandwidth.

In another aspect, generally, the invention features a method of decoding a transmitted encoded digital signal that decodes into frames of frequency coefficients arranged in bands. When frequency coefficients in a frame have insufficient signal content, the method includes the step of replacing those frequency coefficients with random noise. The use of random noise masks distortion that would otherwise reduce the subjective quality of the final decoded signal.

DESCRIPTION OF A PREFERRED EMBODIMENT

Figure 1:
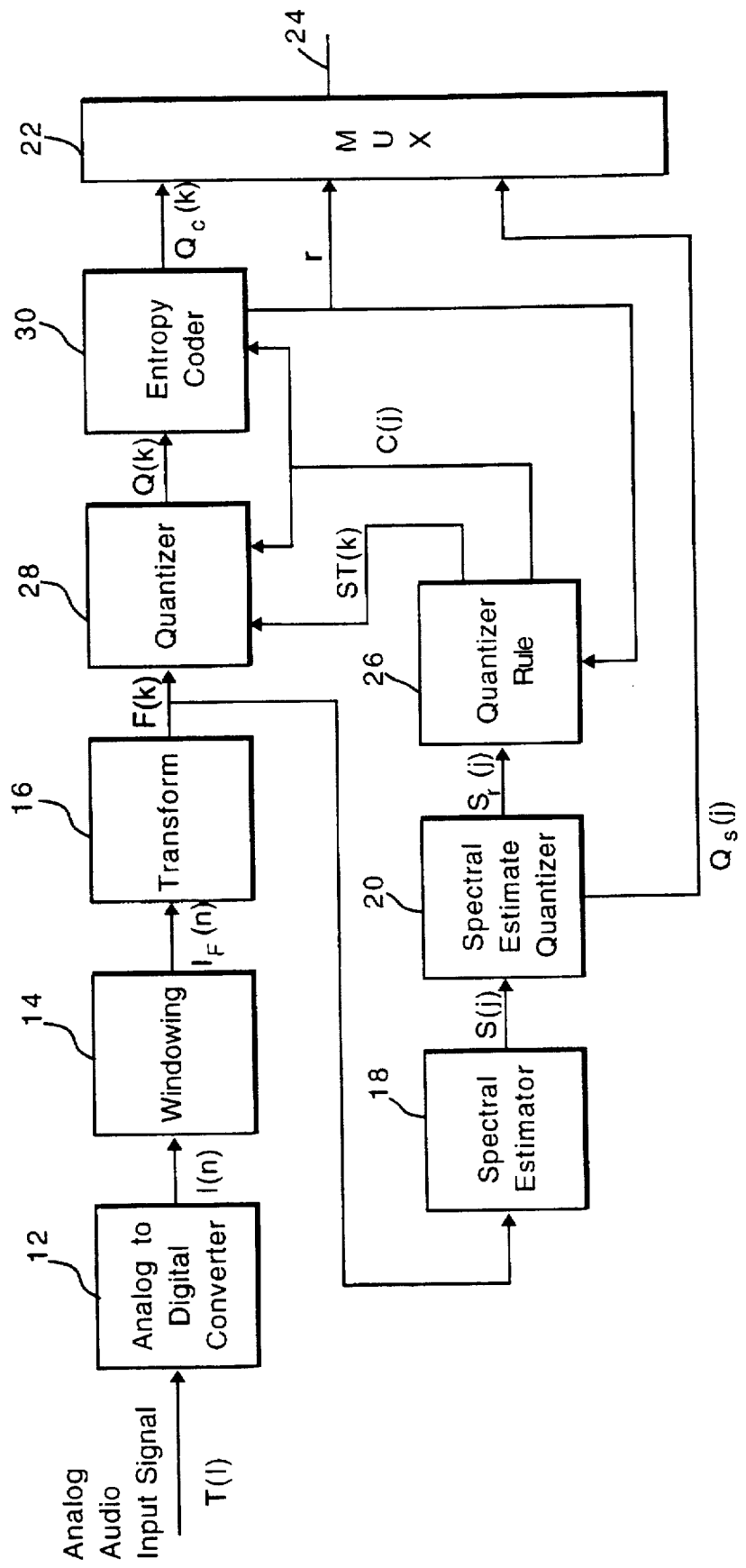
FIG. 1 is a block diagram of an encoder according to a preferred embodiment of the invention.

Referring to FIG. 1, a fixed bit rate speech encoder 10 encodes an analog audio input signal, I(t), where t is a variable representing time, for transmission over a digital transmission channel 24. Encoder 10 compresses analog audio input signal I(t) by eliminating unnecessary components such as low-energy background noise and by minimizing redundant information.

Initially, an analog-to-digital converter 12 converts analog audio input signal I(t) into a digital input signal, I(n), where n is an integer representing a moment in time. Since analog-to-digital converter 12 samples at sixteen kilohertz, digital input signal I(n) includes 16,000 samples each second.

A windowing module 14 receives digital input signal I(n) and separates the samples of I(n) into frames $I_F(n)$ that, in the illustrated embodiment, consist of 512 consecutive samples. Thus, windowing module 14 groups samples that each represent the state of audio input signal I(t) at a moment in time into frames that represent this state over a more extended duration. To reduce the effects of discontinuities introduced at the beginning and end of the frames, each frame includes the last 32 samples from the previous frame and 480 new samples, with the first 32 and last 32 samples being appropriately weighted. The last 32 samples of the current frame are saved in a buffer for use at the beginning of the next frame. Accordingly, a frame is generated every thirty milliseconds.

A discrete cosine transform (DCT) transform module 16 then converts each 512 sample frame to a collection of 512 frequency coefficients, F(k), where k is an integer representing a discrete frequency in the frame's spectrum. Frequency coefficients F(k) represent the frequency spectrum of the frame and show the extent to which each frequency was present in input audio signal I(t) during the duration represented by the frame. Because the 42 highest frequency coefficients correspond to frequencies that are outside the frequency range of interest (that is, they are not frequencies normally associated with human speech), only the first 470 frequency coefficients F(k) are used in later processing. These 470 frequency coefficients correspond to a bandwidth of approximately 7.3 kHz (15.625 Hz per F(k)). Of course, the concepts presented here are equally applicable to other bandwidths, sampling rates, and bit transmission rates.

Next, a spectral estimator 18 generates a spectral estimate S(j) where j is an integer representing a frequency band. Spectral estimate S(j) is a contour derived from the frequency coefficients F(k), and provides a coarse representation of the spectral envelope. Encoder 10 uses spectral estimate S(j) as a guideline to the characteristics of frequency coefficients F(k). In the illustrated embodiment, spectral estimate S(j) includes 47 components that are generated from the first 470 frequency coefficients F(k), and each represents the average power of a band of ten frequency coefficients. The components of spectral estimate S(j) are generated according to equation 1: where j ranges from 0 to 46.

$$S(j) = \left( \sum_{i=0}^{i=9} (F(10j+i))^2 \right) / 10 \quad (1)$$

A spectral estimate quantizer 20 quantizes the components of spectral estimate S(j) using the well known concept of differential pulse code modulation (DPCM), in which each number in a series of numbers is represented by the difference between it and the previous number. For example, a DPCM encoder with unity feedback that was initialized to zero would encode the series 1, 2, 4, 4 as 1 (1−0), 1 (2−1), 2 (4−2), 0 (4−4). The procedure 100 followed by spectral estimate quantizer 20 is illustrated in FIG. 2 and described in more detail below.

The quantized spectral estimate components, $Q_{s(j)}$, are sent to a multiplexer 22 for transmission along a digital transmission channel 24. A decoder 50 (see FIG. 8), at the other end of digital transmission channel 24, reconstructs spectral estimate S(j) from quantized spectral estimate $Q_{s(j)}$, and uses the reconstructed spectral estimate, $S_r(j)$, in generating an audio output signal. However, due to the operation of spectral estimate quantizer 20, reconstructed spectral estimate $S_r(j)$ does not equal S(j). Therefore, spectral estimate quantizer 20 includes a duplicate of the spectral estimate decoding reconstructor 56 (FIG. 8) used by decoder 50 (FIG. 8) to reconstruct spectral estimate S(j), and generates a reconstructed spectral estimate $S_r(j)$ for use in later processing.

Figure 2:
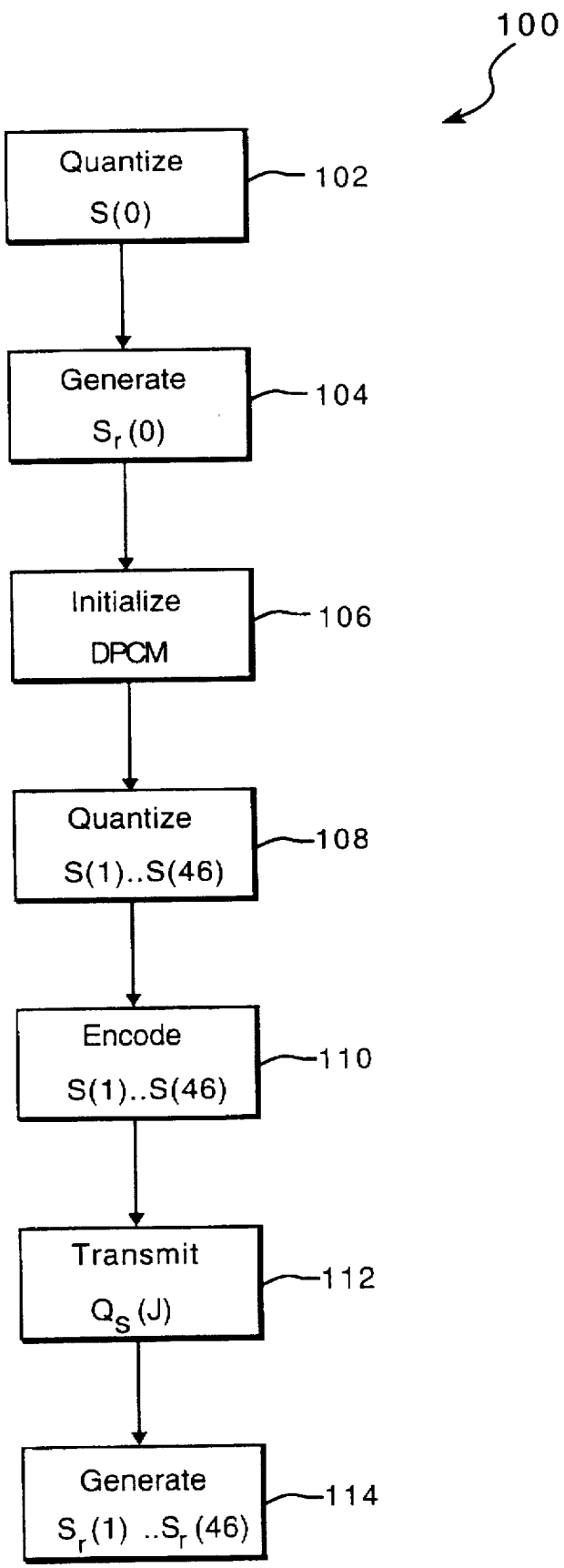
FIGS. 2–3 are flow charts of procedures used by a spectral estimate quantizer and a quantizer rule generator of the encoder of FIG. 1.

Referring also to FIG. 2, spectral estimate quantizer 20 quantizes the first coefficient, S(0), of spectral estimate S(j) differently than the other coefficients, and does so because S(0) includes direct current gain information. Spectral estimate quantizer 20 quantizes the value of S(0) using a mid-tread quantizer with a 6 dB step size to produce $Q_{s(0)}$ (step 102). A mid-tread quantizer assigns the same output value to all inputs falling within a single step, and bases this output value on the middle of the step. For example, with a 6 dB step size, inputs greater than or equal to negative three and less than three are assigned an output value of zero, and inputs greater than or equal to three and less than nine are assigned an output value of one. Four bits are used to represent $Q_{s(0)}$, which allows a dynamic range of 96 dB ($2^4$ * 6 dB). Next, $Q_{s(0)}$ is reconstructed to produce $S_r(0)$ (step 104).

Spectral estimate quantizer 20 then initializes a DPCM encoder using $S_r(0)$ (step 106). Thereafter, spectral estimate quantizer 20 quantizes the remaining 46 spectral estimate coefficients, S(1) . . . S(46), using the DPCM encoder, which is a first order mid-tread DPCM encoder having a 6 dB step size and unity feedback (step 108). The quantized values are all integers between −8 and 14 (which, as shown in Table 1, allow for Huffman codes of fifteen bits or less). The quantized values are then Huffman coded according to Table 1 to produce $Q_{s(1)}$ . . . $Q_{s(46)}$ (step 110).

TABLE 1

| Quantized Value | Huffman Code |
| --- | --- |
| −8 | 001000010111101 |
| −7 | 001000010111110 |
| −6 | 001000010111100 |
| −5 | 0010000101110 |
| −4 | 0010000100 |
| −3 | 0010001 |
| −2 | 0011 |
| −1 | 01 |
| 0 | 1 |
| 1 | 000 |
| 2 | 00101 |
| 3 | 00100000 |
| 4 | 001001011 |
| 5 | 001001001 |
| 6 | 001001100 |
| 7 | 001000011 |
| 8 | 00100111 |
| 9 | 001001000 |
| 10 | 001001010 |
| 11 | 001001101 |
| 12 | 00100001010 |
| 13 | 001000010110 |
| 14 | 001000010111111 |

The encoded values, $Q_{s(1)}$ . . . $Q_{s(46)}$ for the frame, along with the four bits of $Q_{s(0)}$, are transmitted to multiplexer 22 (step 112). Finally, encoded values $Q_{s(1)}$ . . . $Q_{s(46)}$ are reconstructed to produce $S_r(1)$ . . . $S_r(46)$ (step 114).

Referring again to FIG. 1, a quantizer rule generator 26 accepts reconstructed spectral estimate $S_r(j)$ and a rate index, r, as inputs. Quantizer rule generator 26 produces class values, C(j), related to each ten coefficient band of frequency coefficients represented by a reconstructed spectral estimate $S_r(j)$, and step sizes, ST(k), related to each frequency coefficient F(k).

Quantizer rule generator 26 produces step sizes ST(k) that vary with the signal energy of the frequency coefficient F(k), producing large step sizes for frequencies having high signal energy and smaller step sizes for frequencies having lower signal energy. By varying the step size, quantizer rule generator 26 exploits a phenomenon of the human auditory system that allows more distortion in high energy (peak) regions of the frequency spectrum than in low energy (trough) regions. Because high signal energy in peak regions is better able to mask quantization distortion introduced in those regions, the listener does not readily perceive the distortion and encoder 10 need not minimize the quantization distortion. Similarly, because low signal energy in trough regions is less able to mask quantization distortion introduced in those regions, encoder 10 minimizes quantization distortion in those regions.

As one aspect of achieving this advantage, the frequency coefficients that correspond to trough regions having very low energy are not quantized or transmitted at all. As is discussed in more detail below, those frequency components are assigned a class value C(j) of zero. As is also discussed below, decoder 50 (FIG. 8) uses a technique called noise-fill-in to minimize any distortion in the reconstructed speech resulting from the failure to transmit low energy frequency components.

Figure 3:
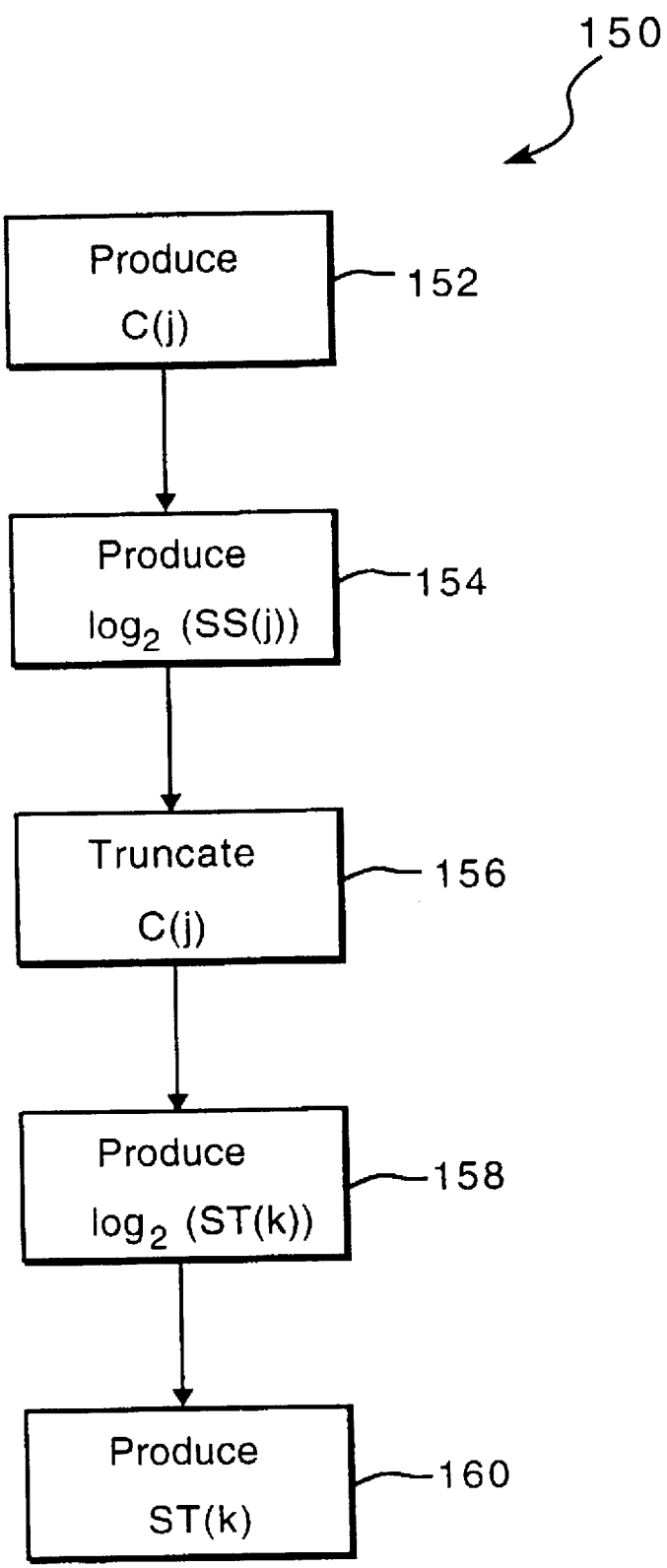

Referring also to FIG. 3, quantizer rule generator 26 performs a procedure 150. First, quantizer rule generator 26 produces class values C(j) for each of the 47 components of spectral estimate S(j) (step 152). Each class value applies to a band of 10 frequency coefficients (the same band that was used to derive the respective S(j)), and relates the energy in the band to the average energy of the other bands in the frame. Quantizer rule generator 26 produces class values using equation 2:

$$C(j) = r + \frac{1}{2} \log_2(S_r(j)^2) - \frac{1}{2D} \sum_{j=0}^{j=D-1} \log_2(S_r(j)^2) \quad (2)$$

where r is a rate index relating to bit usage as described below and supplied by an entropy coder 30, and D=47, the number of spectral estimate components. Generally, the more energy in a band, relative to the average energy of all of the bands in the frame, the higher the class value C(j).

Figure 4:
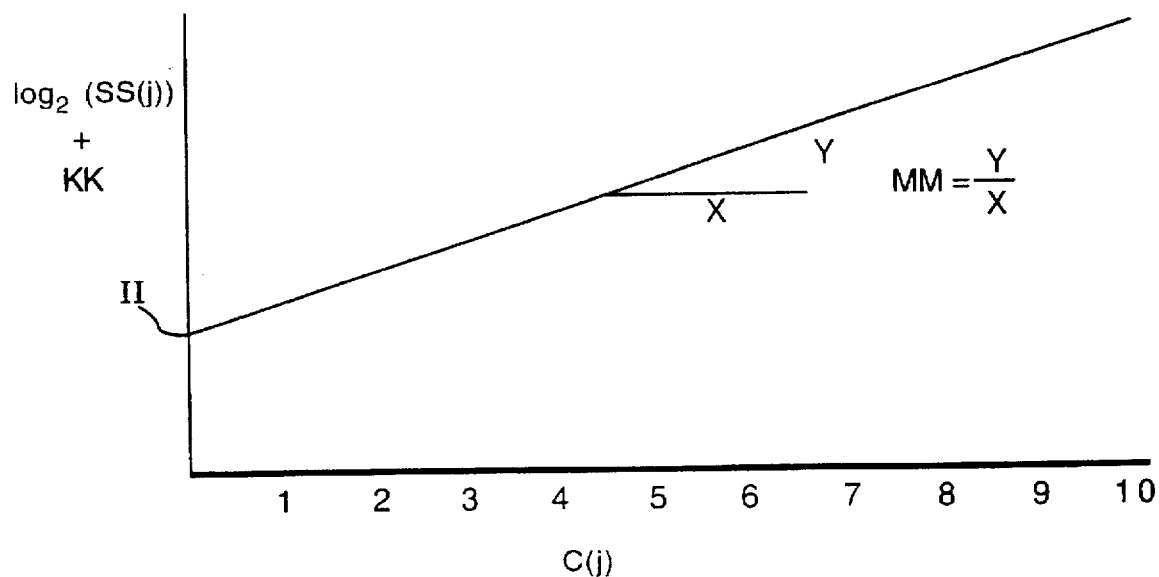
FIGS. 4–5 are graphs illustrating aspects of the procedure of FIG. 3.

Referring also to FIG. 4, quantizer rule generator 26 defines a log step size parameter, $\log_2(SS(j))$, for each of the 47 reconstructed components of spectral estimate $S_r(j)$ using equation 3 (step 154) as:

$$\log_2(SS(j)) = MM * C(j) - KK + II \quad (3)$$

where KK is defined in equation 4:

$$KK = r - \frac{1}{2d} \sum_{j=0}^{j=D-1} \log_2(S_r(j)^2) \quad (4)$$

As shown in FIG. 4, II is the intercept and MM is the slope of a predefined straight line segment. Thus, if the value of $\log_2(SS(j))$ were being selected visually, one would find the point on the line segment corresponding to the appropriate value of C(j) and subtract KK. In the illustrated implementation, values for MM and II, which are constant for all inputs to quantizer rule generator 26, are 0.2076 and 1.8839 respectively. For a given set of inputs to quantizer rule generator 26, KK is also constant.

After producing the log step sizes at step 154, quantizer rule generator 26 converts class values C(j) to integer form (step 156). Quantizer rule generator 26 does so by truncating the class values according to equations 5, 6, and 7:

$$C(j) = \lfloor C(j) + 1 \rfloor \quad (5)$$

$$C(j) = 0 \text{ if } \lfloor C(j) + 1 \rfloor < 0 \quad (6)$$

$$C(j) = 10 \text{ if } \lfloor C(j) + 1 \rfloor > 10 \quad (7)$$

As is discussed below, the ten frequency coefficients F(k) that correspond to the spectral estimate S(j) for any class value C(j) that equals zero are not quantized or transmitted.

Figure 5:
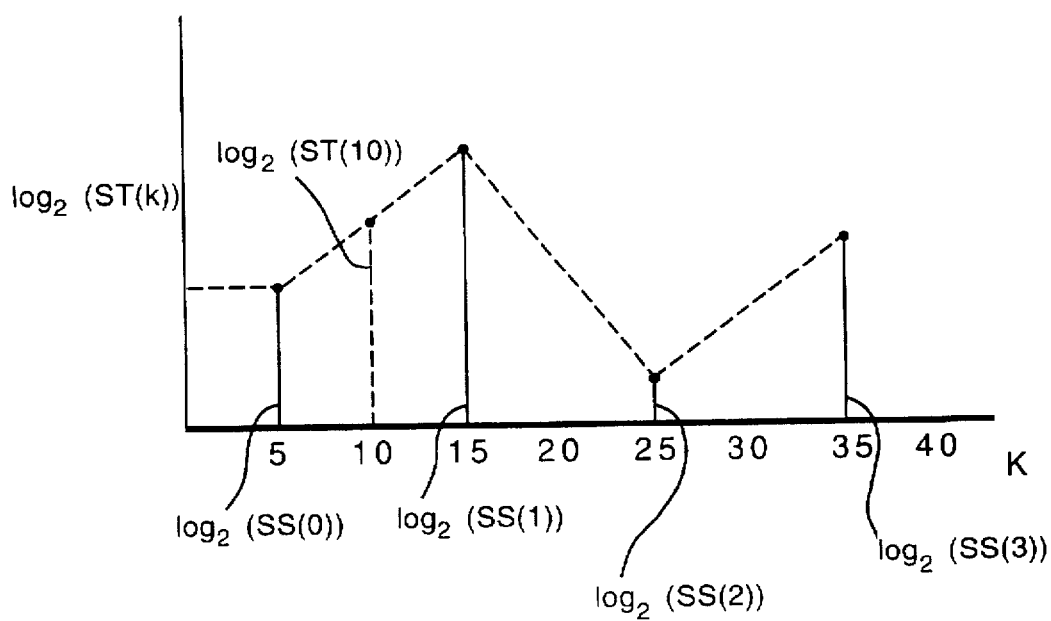

Referring also to FIG. 5, quantizer rule generator 26 produces log step sizes $\log_2(ST(k))$ for the 470 frequency coefficients F(k) by interpolating from the log step sizes $\log_2(SS(j))$ produced from the components of spectral estimate S(j) (step 158). In the illustrated embodiment, log step sizes $\log_2(ST(k))$ are produced by linear interpolation. Other types of interpolation may be used. Thereafter, quantizer rule generator 26 produces step sizes ST(k) from the inverse logarithms of log step sizes $\log_2(ST(k))$ (step 160).

A quantizer 28 quantizes those of the first 470 frequency coefficients F(k) that have a class value greater than zero to produce quantized coefficients Q(k). The frequency coefficients F(k) having a class value equal to zero are not quantized because they are not transmitted over digital transmission channel 24. Each frequency coefficient F(k) is quantized using a mid-tread quantizer with a step size equal to the ST(k) produced by quantizer rule generator 26 for that frequency coefficient. The values of the quantized coefficients Q(k) are restricted to predetermined numerical ranges for each class value according to Table 2. Limiting the range of output values based on class values allows the memory space occupied by Huffman encoding tables in entropy coder 30 to be determined in advance, because the size of the Huffman encoding tables is based on the range, and hence number, of values to be encoded.

TABLE 2

| Class Value | Range of Quantized Coefficients |
|---|---|
| 0 | 0 |
| 1 | −3 to 3 |
| 2 | −3 to 3 |
| 3 | −7 to 7 |
| 4 | −15 to 15 |
| 5 | −31 to 31 |
| 6 | −63 to 63 |
| 7 | −63 to 63 |
| 8 | −127 to 127 |
| 9 | −255 to 255 |
| 10 | −255 to 255 |

Entropy coder 30 encodes quantized coefficients Q(k) to produce coded coefficients $Q_c(k)$. Entropy coder 30 uses a coding technique that attempts to ensure that as much bandwidth compression as possible is achieved so that the maximum number of coded coefficients $Q_c(k)$ that are actually transmitted is as large as possible. By maximizing the number of coded coefficients that are transmitted, entropy coder 30 ensures that the audio output produced by decoder 50 (FIG. 8) is of the highest possible quality for the available digital transmission bandwidth (i.e., 24,000 bits per second).

The coding technique used by entropy coder 30 includes a unique feedback loop that includes entropy coder 30, quantizer rule generator 26, and quantizer 28. Through the feedback loop, entropy coder 30 controls the number of bits needed to represent the coded coefficients $Q_c(k)$ of each frame. Entropy coder 30 does so by iteratively adjusting the value of rate index r and supplying the adjusted value to quantizer rule generator 26. Rate index r controls the step sizes ST(k) and class values C(j) output by quantizer rule generator 26 which, in turn, control the precision of the quantized coefficients Q(k) output by quantizer 28. Because the number of bits needed to represent coded coefficients $Q_c(k)$ is directly related to the precision of the quantized coefficients Q(k) (and increases with increasing precision), entropy coder 30 controls this number of bits by controlling rate index r. For example, when the number of bits needed to represent coded coefficients $Q_c(k)$ for a frame exceeds the number that can be transmitted, entropy coder 30 reduces the rate index r. This reduces the precision of quantized coefficients Q(k) by (a) increasing the step size for each frequency coefficient and (b) tending to reduce the class value for a particular band.

Figure 6:
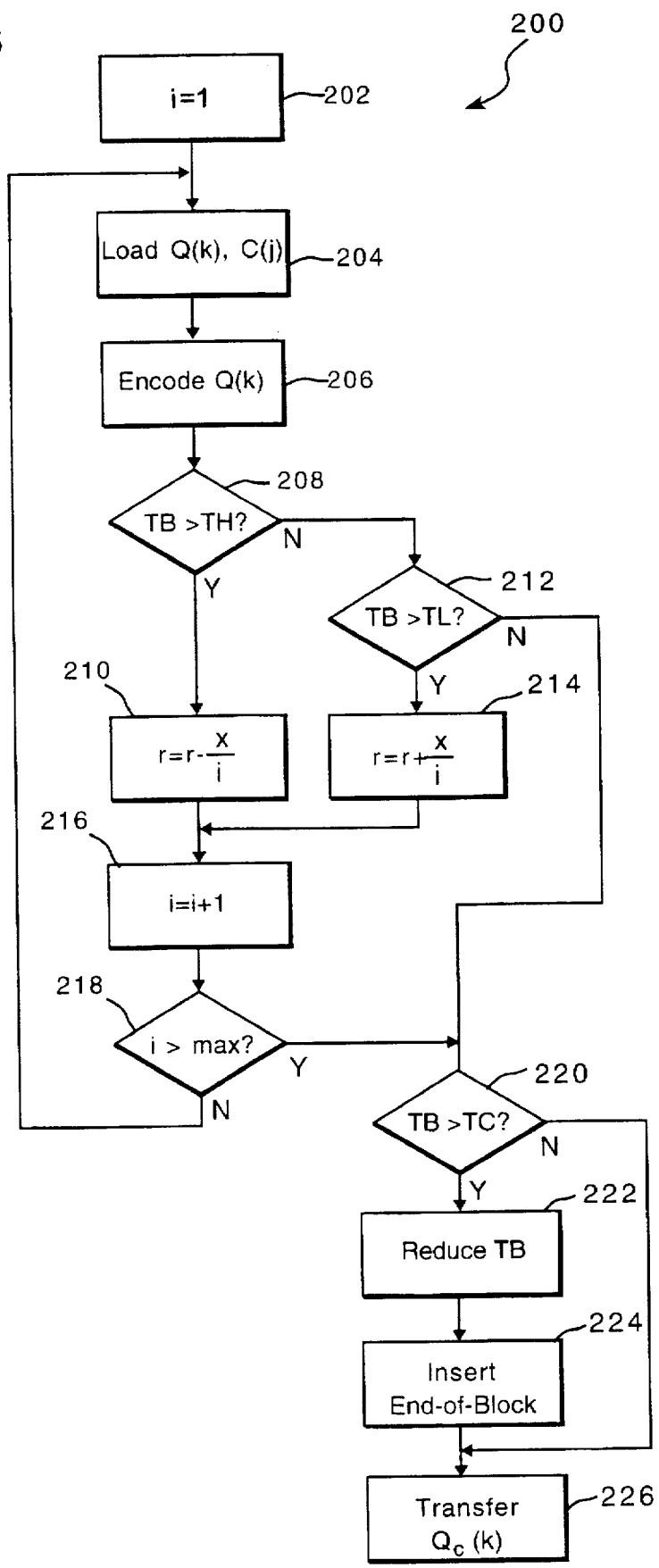
FIGS. 6–7 are flow charts of procedures used by a quantizer of the encoder of FIG. 1.

Referring also to FIG. 6, entropy coder 30 produces coded coefficients $Q_c(k)$ for each input frame using a procedure 200 that relies on the feedback mechanism discussed above to control the final number of bits used. The feedback maintained through rate index r enables entropy coder 30 to ensure that the available channel bandwidth of 24,000 bits per second (or 720 bits per input frame) is fully utilized. The feedback governs the total number of bits used for encoding so that the total is as close as possible to that allowed for the transmission of a given frame (720 bits) over digital transmission channel 24.

First, entropy coder 30 initializes rate index r to 0.55 (a value that has proven useful in the illustrated embodiment) and an iteration count, i, to 1 (step 202). Next, entropy coder 30 loads quantized coefficients Q(k) and class values C(j) (step 204), which are based, in part, on the just-initialized rate index r. Using class values C(j) to control Huffman coding of the corresponding group of Q(k) according to a procedure 250 discussed in more detail below, entropy coder 30 encodes quantized coefficients Q(k) to produce coded coefficients $Q_c(k)$ (step 206). As discussed below, while encoding quantized coefficients Q(k), entropy coder 30 sets TB, the total number of bits needed to represent the frame, equal to the sum of (a) the number of bits in coded coefficients $Q_c(k)$, (b) the number of bits in the quantized spectral estimates $Q_{s(j)}$, and (c) the number of bits needed to represent r.

Next, entropy coder 30 determines whether TB exceeds TH, an upper threshold (step 208). In the illustrated embodiment, this upper threshold equals 756 and therefore exceeds TC, the number of bits allowed for transmission over digital transmission channel 24, which equals 720. If TB is greater than TH, entropy coder 30 reduces the index rate (step 210), which will in turn reduce the total number of bits needed to encode the frame during the next iteration (when compared to the previous rate index r) according to equation 8:

$$r = r - \frac{C}{i} \quad (8)$$

where i is the iteration count and c is a constant equal to 0.23. The iteration count is used in modifying rate index r so that, with each iteration, rate index r will change by a smaller amount. This allows rate index r to approach an optimum value. For example, if the initial value for rate index r produced a TB that was too large (because rate index r was too large), and the first iteration value for rate index r produced a TB that was too small (because the adjusted rate index r was too small), then the second iteration value for rate index r is likely to produce an acceptable TB (because the new rate index r, as described below, will be somewhere between the previous two values that were either too large or too small).

If TB is not greater than TH, entropy coder 30 determines whether TB is less than TL, a lower threshold (step 212). In the illustrated embodiment, TL equals 720 and therefore also equals TC. If TB is less than TL, entropy coder 30 increases the index rate (step 214), which will in turn increase the total number of bits needed to encode the frame during the next iteration (when compared to the previous rate index r) according to equation 9: where i is the iteration count and c is a constant equal to 0.23.

$$r = r + \frac{C}{i} \quad (9)$$

If TB is greater than TH or less than TL, entropy coder 30 increments the iteration count (step 216) and determines whether the new iteration count exceeds a predetermined maximum (which equals four in the illustrated embodiment) (step 218). If the iteration count does not exceed the maximum, then, for the same frame, entropy coder 30 loads the new values for quantized coefficients Q(k) and class values C(j) that resulted from the change in rate index r (step 204).

If the iteration count exceeds the maximum, or if TB is not greater than TH and is not less than TL, entropy coder 30 determines whether TB is greater than TC (step 220). If so, entropy coder 30 reduces the number of coded coefficients $Q_c(k)$ in the frame to be transferred (step 222) by starting with the coefficients corresponding to the highest frequency and working toward the lowest frequency, and does so until TB is less than or equal to TC minus sixteen. After reducing the number of coded coefficients $Q_c(k)$ to be transferred, entropy coder 30 inserts at the end of coded coefficients $Q_c(k)$ an end-of-block symbol that can be up to sixteen bits long (step 224). This symbol indicates to the decoder that not all quantized coefficients Q(k) were encoded for transfer as coded coefficients $Q_c(k)$. Finally, entropy coder 30 transmits coded coefficients $Q_c(k)$ to multiplexer 22.

Figure 7:
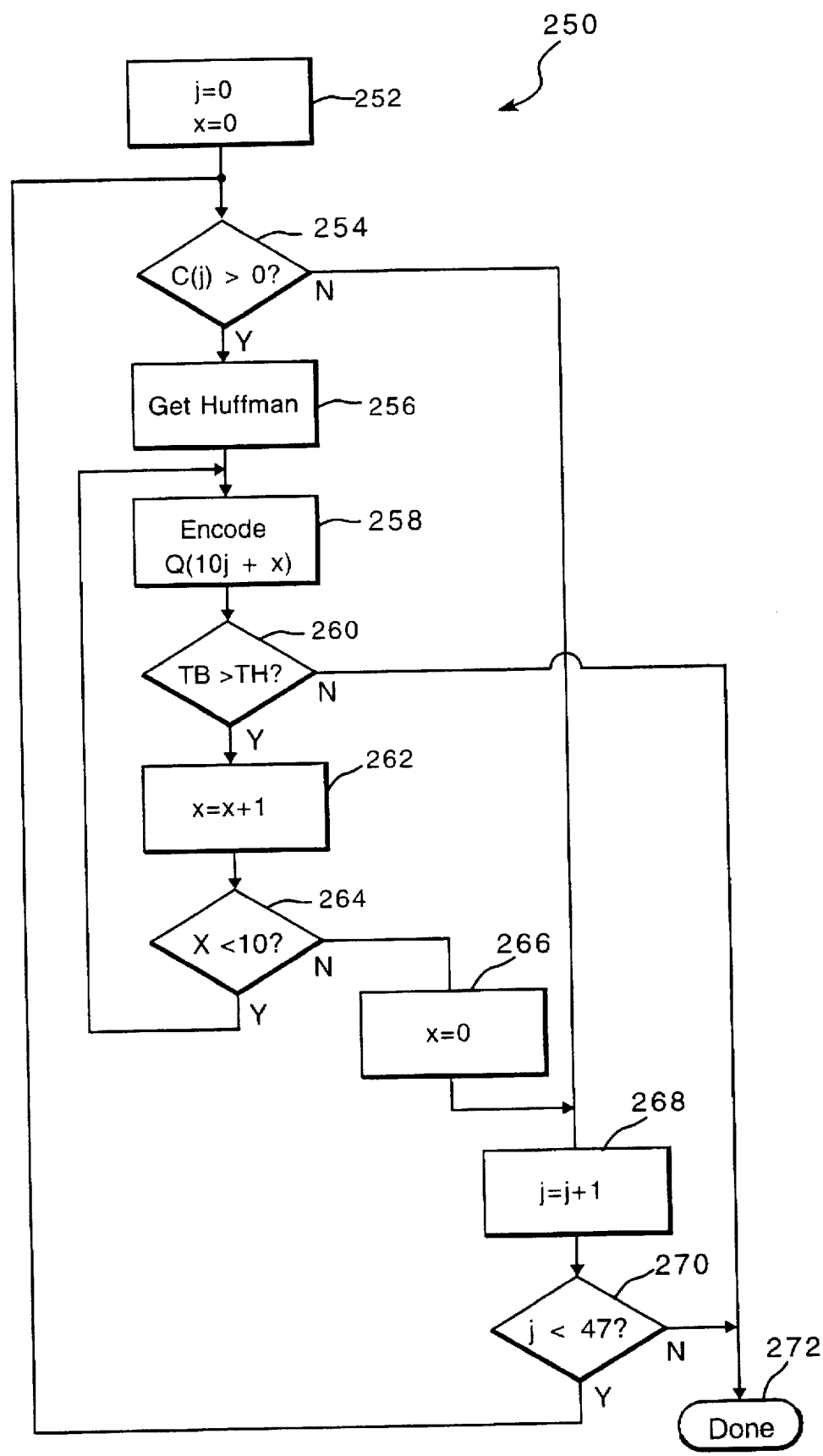

Referring now to FIG. 7, to produce coded coefficients $Q_c(k)$ and to determine TB for a particular value of rate index r, entropy coder 30 first initializes variables j and x to 0 (step 252). Entropy coder 30 then determines whether class value C(j) is greater than zero (step 254). If so, entropy coder 30 selects a Huffman encoder table based on the class value C(j) (step 256). There are ten Huffman encoder tables, one for each of the class values C(j) between one and ten. The Huffman encoder table for class values of one appears below as Table 4, the Huffman encoder tables for class values from two to ten are included in the attached Appendix. As already noted, no quantized coefficients Q(k) are produced when the associated class value C(j) equals zero, so a Huffman encoder table is not needed for this class value.

Based on the selected Huffman encoder table, entropy coder 30 jointly encodes quantized coefficient Q(10 j+x) and any subsequent quantized coefficients having consecutive values of zero, up to a run of fifteen such coefficients (step 258). When such subsequent zero-valued quantized coefficients exist, entropy coder 30 increments j and x as needed to account for the encoded coefficients. First, entropy coder 30 determines which category in a predefined set of categories, as set forth in Table 3, contains the value of quantized coefficient Q(10 j+x).

TABLE 3

| Category | Range of Values |
|---|---|
| 0 | 0 |
| 1 | −1, 1 |
| 2 | −3 to −2, 2 to 3 |
| 3 | −7 to −4, 4 to 7 |
| 4 | −15 to −8, 8 to 15 |
| 5 | −31 to −16, 16 to 31 |
| 6 | −63 to −32, 32 to 63 |
| 7 | −127 to −64, 64 to 127 |
| 8 | −255 to −128, 128 to 255 |

The category and the number of consecutive zero-valued quantized coefficients (the run-length, which ranges from 0 to 15) are jointly represented as one byte. The value "1" is added to this byte to ensure that the byte is never equal to zero (because a value of zero is used to represent a special end-of-block symbol). The new value of this byte is then selected from the Huffman encoder table that was previously selected. The number of entries in the Huffman encoder tables vary with the class value because the class value limits the range of values for quantized coefficients and thereby limits the number of possible categories. For example, as shown in Table 4, there are fourty-nine entries in the Huffman encoder table for a class value of one. These fourty-nine entries correspond to the product of the three possible categories (0, 1 or 2) and the sixteen possible run-lengths plus the end-of-block symbol.

TABLE 4

| Category | Run Length | Huffman Code |
|---|---|---|
|  | End-of-Block | 1111100 |
| 0 | 0 | 1111011 |
| 0 | 1 | 1111111 |
| 0 | 2 | 01000111 |
| 0 | 3 | 01100111 |
| 0 | 4 | 11110101 |
| 0 | 5 | 11111101 |
| 0 | 6 | 010001101 |
| 0 | 7 | 010001100 |
| 0 | 8 | 011001101 |
| 0 | 9 | 111101001 |
| 0 | 10 | 111111001 |
| 0 | 11 | 0110011000 |
| 0 | 12 | 1111010000 |
| 0 | 13 | 1111010001 |
| 0 | 14 | 1111110000 |
| 0 | 15 | 1111101 |
| 1 | 0 | 10 |
| 1 | 1 | 001 |
| 1 | 2 | 110 |
| 1 | 3 | 0000 |
| 1 | 4 | 0101 |
| 1 | 5 | 0111 |
| 1 | 6 | 1110 |
| 1 | 7 | 00010 |
| 1 | 8 | 01001 |
| 1 | 9 | 01101 |
| 1 | 10 | 010000 |
| 1 | 11 | 011000 |
| 1 | 12 | 111100 |
| 1 | 13 | 0100010 |
| 1 | 14 | 0110010 |
| 1 | 15 | 00011 |
| 2 | 0 | 11111100011 |
| 2 | 1 | 011001100100 |
| 2 | 2 | 1111110001000 |
| 2 | 3 | 0110011001111 |
| 2 | 4 | 1111110001001 |
| 2 | 5 | 1111110001010 |
| 2 | 6 | 0110011001011 |
| 2 | 7 | 01100110011001 |
| 2 | 8 | 111111001011 |
| 2 | 9 | 01100110010101 |
| 2 | 10 | 011001001110 |
| 2 | 11 | 01100110011010 |
| 2 | 12 | 01100110011011 |
| 2 | 13 | 01001100101000 |
| 2 | 14 | 01001100101001 |
| 2 | 15 | 01100110011000 |

After encoding the category and run length, the actual value of the quantized coefficient is encoded as an index within the category. This index is represented by a series of bits, known as the amplitude bits, that equals the category. Thus, there are three amplitude bits for category 3 and only one amplitude bit for category 1. The amplitude bits are appended to the end of the Huffman code to create the encoded quantized coefficient $Q_c(10\,j+x)$.

After encoding the quantized coefficient, entropy coder 30 determines whether TB exceeds TH (step 260). If not, entropy coder increments x (step 262). If the incremented value of x is less than ten, entropy coder 30 encodes the next quantized coefficient Q(10 j+x) (step 258). If the incremented value of x equals ten, then entropy coder 30 sets x equal to zero (step 266) and increments j (step 268).

Entropy coder 30 also increments j (step 268) if the class value C(j) equals zero. If j is less than 47 (step 270), entropy coder 30 then determines whether class value C(j) is greater than zero (step 254). If j equals 47 (step 270), or if TB is greater than TH (step 260), entropy coder 30 stops encoding Q(k) (step 272) as noted above.

Figure 8:
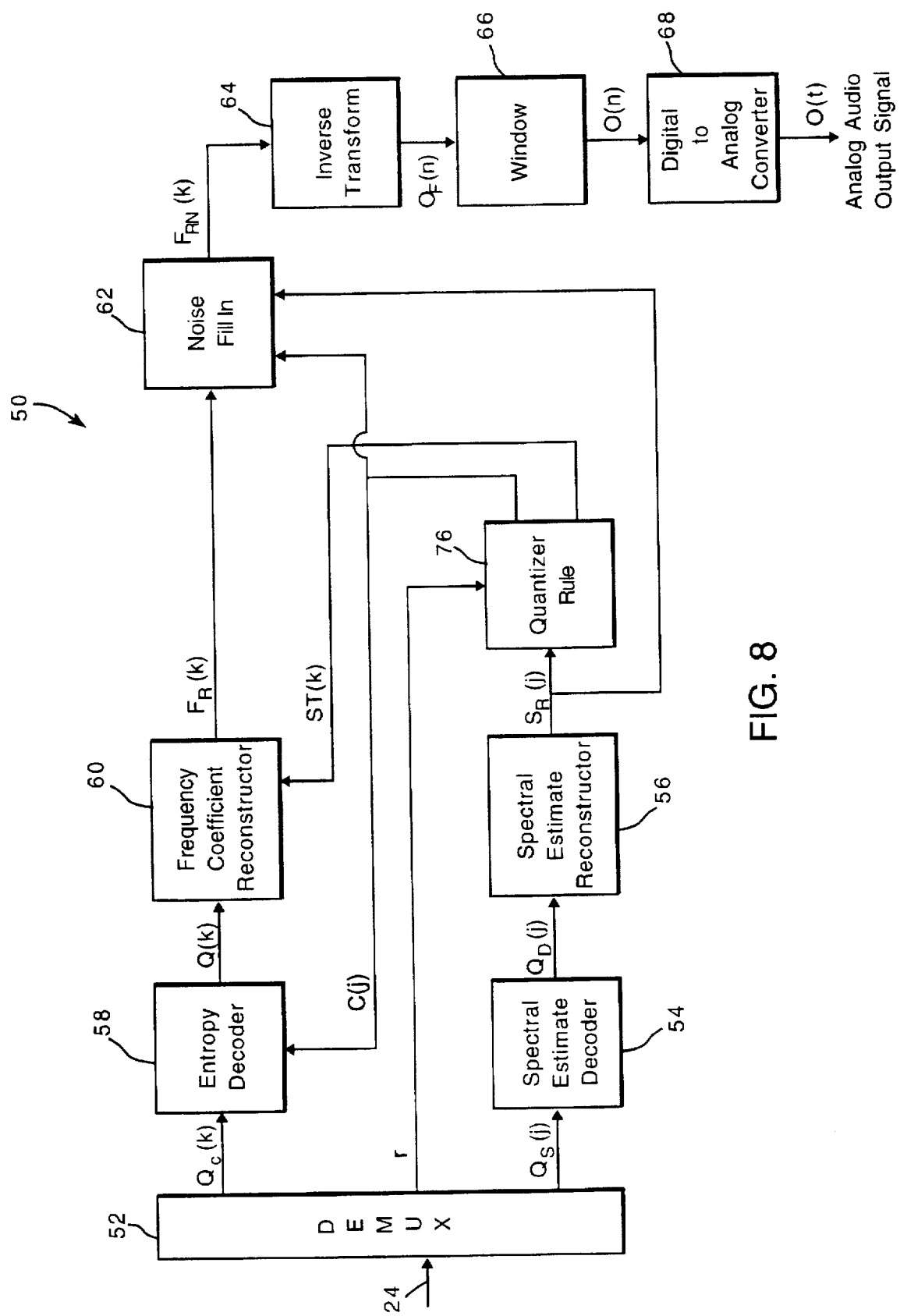
FIG. 8 is a block diagram of a decoder for the encoder of FIG. 1.

Referring to FIG. 8, decoder 50 includes a demultiplexer 52 that receives the incoming 24 kilobit per second bit stream and divides it into quantized spectral estimates $Q_{s(j)}$, rate index r, and coded coefficients $Q_c(k)$ (which are decoded after the quantized spectral estimates $Q_{s(j)}$ are decoded). Based on this information, in addition to having copies of the Huffman coding tables used by encoder 10 (FIG. 1) and duplicates of the quantizer rule generator 26 and the DPCM decoder embedded in spectral estimate quantizer 20 of decoder 10, decoder 50 produces an analog audio output signal O(t) that is a close approximation of the analog audio signal I(t) input to encoder 10.

A spectral estimate decoder 54 produces decoded quantized spectral estimates $Q_D(j)$ from quantized spectral estimates $Q_{s(j)}$. Spectral estimate decoder 54 decodes the non-Huffman coded symbol (4 bits) for $Q_{s(0)}$, and Huffman decodes the remaining 46 spectral estimates $Q_{s(1)} \ldots Q_{s(46)}$. A spectral estimate reconstructor 56 then produces reconstructed spectral estimate $S_r(j)$ using a DPCM decoder that is identical to the DPCM decoder embedded in spectral estimate quantizer 20 (FIG. 1). The initial state of the DPCM decoder is set according to the reconstructed level of $Q_{s(0)}$. Next, a quantizer rule generator 26 that is identical to that of encoder 10 (FIG. 1) produces class values C(j) and step sizes ST(k) from the reconstructed spectral estimate $S_r(j)$ and transmitted rate index r for the frame.

An entropy decoder 58 uses the class values C(j) from quantizer rule generator 26 to decode coded coefficients $Q_c(k)$ into decoded coefficients Q(k). Class values C(j) indicate which Huffman decode table to use to decode each coefficient. A frequency coefficient reconstructor 60, using step sizes ST(k) converts the decoded coefficients Q(k) into reconstructed frequency coefficients $F_r(k)$. Frequency coefficient reconstructor 60 uses a uniform threshold quantizer, which yields an excellent mean square error match to the original frequency coefficients F(k).

A noise-fill-in module 62 accounts for frequency bands having insufficient signal content and produces frequency coefficients $F_m(k)$ by modifying those frequency bands having insufficient signal content. Noise-fill-in is used on three types of frequency bands: (a) those that were not transmitted because they had class values C(j) equal to zero, (b) those for which all reconstructed frequency components $F_r(k)$ are equal to zero, and (c) those for which the total energy of the reconstructed frequency components $F_r(k)$ is less than the reconstructed spectral estimate $S_r(j)$ corresponding to the $F_r(k)$ by a predetermined amount which, in the illustrated embodiment, equals 6 dB. In each of these cases, random noise having variance equivalent to the square of the corresponding spectral estimate, $(S_r(j))^2$, is injected by replacing the reconstructed frequency components $F_r(k)$ of those frequency bands having insufficient signal content with the random noise. Note that noise-fill-in is not used for the frequency components that are never transmitted because they correspond to unwanted high frequencies (k>469).

Noise-fill-in module 62 allows subjective masking of distortion that would otherwise be audible to the listener if noise-fill-in were not used, which results in a high-quality, low-bit-rate encoder. Noise-fill-in exploits the ear's apparent insensitivity to phase distortion.

Noise-fill-in module 62 uses a zero-mean random number generator to generate noise. The variance of the random generator is adjusted, as noted above, to equal that of the particular spectral estimate $S_s(j)$ being considered. A constant noise coefficient is used as a final adjustment to the noise variance and is used to scale the variance of the injected random noise. In the illustrated embodiment, the noise coefficient equals 2.3.

An inverse transform module 64 then converts each frame of frequency coefficients $F_m(k)$ into a 512 sample frame $O_F(n)$ in the time domain. Prior to performing the conversion inverse transform module 64 sets all values of $F_m(k)$ for k greater than 469 equal to zero and thereby creates a set of 512 frequency coefficients for use as input to the inverse transform. A windowing module 66 outputs the first 480 samples from each frame as digital output signal O(n). Windowing module 66 retains the last 32 samples from each frame and appropriately windows these samples with the first 32 samples of the next frame prior to output. Finally, a digital-to-analog converter 68 converts digital output signal O(n) into an audio output signal, O(t).

In this manner, operating according to the invention, aesthetically pleasing, high quality audio sound reproduction can be achieved while using only half of the bandwidth typically allowed for the audio signal.

Figure 9:
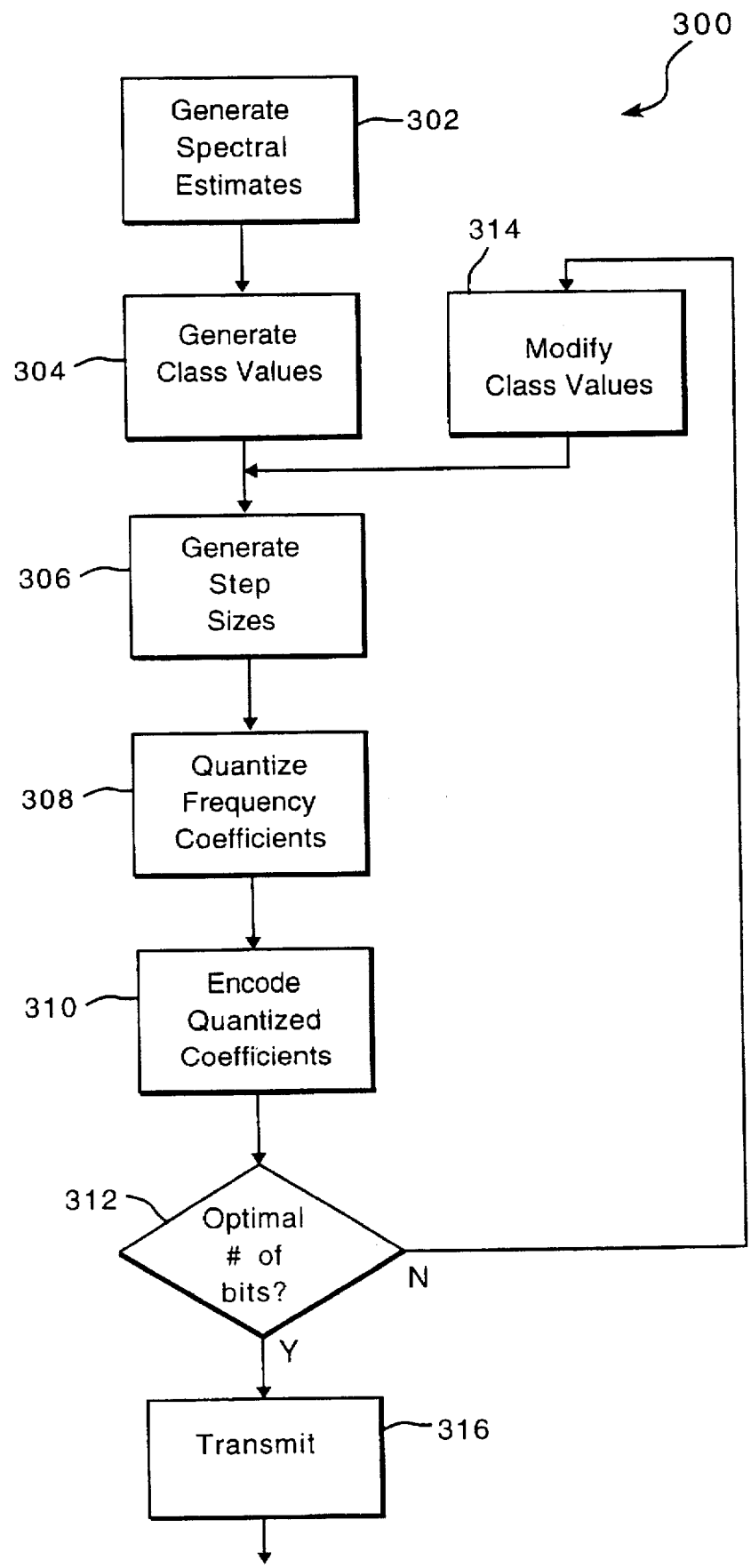
FIG. 9 is a block diagram of a procedure implemented by an encoder.

Referring to FIG. 9, in summary, frequency coefficients produced, for example, by transform module 16 (FIG. 1) and arranged in bands are processed and transmitted according to a procedure 300. First, for each band, a spectral estimate of energy in the band (step 302) and a class value that corresponds to energy in the band relative to the average energy in other bands (step 304) is generated. Next, a step size for each of the frequency coefficients is generated based on the spectral estimate for the band in which the frequency coefficient is arranged (step 306) so that the step size for a first frequency coefficient in a first band having relatively higher energy is larger than the step size for a second frequency coefficient in a second band having relatively lower energy. Next, quantized frequency coefficients are produced by quantizing frequency coefficients based on a relationship between a value of a frequency coefficient, a class value generated for the band in which the frequency coefficient is arranged, and a step size generated for the frequency coefficient (step 308). The quantized frequency coefficients are then encoded based on the class values to produce encoded quantized frequency coefficients that are represented by a number of bits that is related to the class values (step 310). If the number of bits does not correspond to an optimal value (step 312), the class values are modified (step 314) and the steps of generating step sizes (step 306), quantizing the frequency coefficients (step 308) and encoding the quantized frequency coefficients (step 310) are repeated. When the number of bits are optimized, the encoded quantized frequency coefficients are transmitted (step 316).

Other embodiments are within the following claims. For example, other transforms such as a discrete fourier transform could be substituted for the DCT transform and/or linear prediction techniques could replace spectral estimates. Similarly, arithmetic coding could be substituted for Huffman coding. Also, rather than encoding quantized coefficients Q(k) sequentially to produce coded coefficients $Q_c(k)$ and eliminating the high frequency components when TB is too large, entropy coder 30 could encode quantized coefficients Q(k) in other ways. For example, quantized coefficients Q(k) could be grouped according to class value and those quantized coefficients Q(k) corresponding to the smallest class values could be eliminated when TB is too large.

APPENDICES

FOR

APPLICATION

FOR

UNITED STATES LETTERS PATENT

~~24 PAGES~~

TITLE: A FIXED BIT RATE SPEECH ENCODER/DECODER

APPLICANT: ANTONY HENRY CROSSMAN, BRANT MARTIN HELF

"Express Mail" mailing label number __HB889 291 345__
Date of Deposit __July 7, 1993__
I hereby certify under 37 CFR 1.10 that this correspondence is being deposited with the United States Postal Service as "Express Mail Post Office to Addressee" with sufficient postage on the date indicated above and is addressed to the Commissioner of Patents and Trademarks, Washington, D.C. 20231.

__VICTORIA MARKEN__
__Victoria Marken__

APPENDIX
Huffman  Table for Class Value = 2
| Category | Run Length | Huffman Code |
|---|---|---|
| End-of-Block | | 01011111001110 |
| 0 | 0 | 010111111 |
| 0 | 1 | 0100010011 |
| 0 | 2 | 01000001100 |
| 0 | 3 | 01011111000 |
| 0 | 4 | 010111110110 |
| 0 | 5 | 010111110010 |
| 0 | 6 | 0100000111001 |
| 0 | 7 | 0100000111011 |
| 0 | 8 | 0101111101110 |
| 0 | 9 | 01011111001111 |
| 0 | 10 | 010000011101010 |
| 0 | 11 | 010000011101011 |
| 0 | 12 | 010000011101000 |
| 0 | 13 | 010000011101001 |
| 0 | 14 | 01011111011110 |
| 0 | 15 | 01011111011111 |
| 1 | 0 | 1 |
| 1 | 1 | 000 |
| 1 | 2 | 011 |
| 1 | 3 | 0011 |
| 1 | 4 | 00101 |
| 1 | 5 | 01010 |
| 1 | 6 | 001001 |
| 1 | 7 | 010110 |
| 1 | 8 | 0100001 |
| 1 | 9 | 0100011 |
| 1 | 10 | 01000000 |
| 1 | 11 | 01000101 |
| 1 | 12 | 001000111 |
| 1 | 13 | 010001000 |
| 1 | 14 | 010111101 |
| 1 | 15 | 0101110 |
| 2 | 0 | 01001 |
| 2 | 1 | 0010000 |
| 2 | 2 | 00100010 |
| 2 | 3 | 001000110 |
| 2 | 4 | 010111100 |
| 2 | 5 | 0100000100 |
| 2 | 6 | 0100010010 |
| 2 | 7 | 01000001010 |
| 2 | 8 | 01000001111 |
| 2 | 9 | 01000001101 |
| 2 | 10 | 010000010111 |
| 2 | 11 | 010000010110 |
| 2 | 12 | 010111110100 |
| 2 | 13 | 0100000111000 |
| 2 | 14 | 0101111100110 |
| 2 | 15 | 010111110101 |

Huffman Encoder Table for Class Value = 3

| Category | Run Length | Huffman Code |
|---|---|---|
| End-of-Block | | 01010011011001 |
| 0 | 0 | 011111100 |
| 0 | 1 | 0111111111 |
| 0 | 2 | 01111110110 |
| 0 | 3 | 010100110100 |
| 0 | 4 | 0111010110001 |
| 0 | 5 | 0101001101101 |
| 0 | 6 | 01111110111000 |
| 0 | 7 | 0111111110000 |
| 0 | 8 | 01111110111001 |
| 0 | 9 | 010100110110000 |
| 0 | 10 | 010100110110001 |
| 0 | 11 | 01111111101010 |
| 0 | 12 | 01111111101011 |
| 0 | 13 | 01111111101000 |
| 0 | 14 | 01111111101001 |
| 0 | 15 | 0111111011101 |
| 1 | 0 | 1 |
| 1 | 1 | 001 |
| 1 | 2 | 0100 |
| 1 | 3 | 01011 |
| 1 | 4 | 011100 |
| 1 | 5 | 0101000 |
| 1 | 6 | 0111110 |
| 1 | 7 | 01110100 |
| 1 | 8 | 010100101 |
| 1 | 9 | 011110010 |
| 1 | 10 | 0701001001 |
| 1 | 11 | 0111111010 |
| 1 | 12 | 01110101000 |
| 1 | 13 | 01110101111 |
| 1 | 14 | 010100110101 |
| 1 | 15 | 0101001100 |
| 2 | 0 | 000 |
| 2 | 1 | 0110 |
| 2 | 2 | 010101 |
| 2 | 3 | 0111011 |
| 2 | 4 | 01111000 |
| 2 | 5 | 010100111 |
| 2 | 6 | 0101001000 |
| 2 | 7 | 0111010101 |
| 2 | 8 | 0111111100 |
| 2 | 9 | 01110101110 |
| 2 | 10 | 01111111010 |
| 2 | 11 | 011101010011 |
| 2 | 12 | 011101011001 |
| 2 | 13 | 0111111101110 |
| 2 | 14 | 0111010110000 |
| 2 | 15 | 010100110111 |

| | | |
|---|---|---|
| 3 | 0 | 0111101 |
| 3 | 1 | 011110011 |
| 3 | 2 | 0111010101 |
| 3 | 3 | 011101010010 |
| 3 | 4 | 011111101111 |
| 3 | 5 | 0111111101111 |
| 3 | 6 | 0111111101100 |
| 3 | 7 | 01111111101110 |
| 3 | 8 | 0111111101101 |
| 3 | 9 | 01111111101111 |
| 3 | 10 | 0111111110010 |
| 3 | 11 | 01111111101100 |
| 3 | 12 | 01111111101101 |
| 3 | 13 | 0111111110011 |
| 3 | 14 | 01111111100010 |
| 3 | 15 | 01111111100011 |

Huffman Encoder Table for Class Value = 4

| Category | Run Length | Huffman Code |
|---|---|---|
| | End-of-Block | 010110000100101 |
| 0 | 0 | 010111101 |
| 0 | 1 | 01011110011 |
| 0 | 2 | 010110010111 |
| 0 | 3 | 0101111000011 |
| 0 | 4 | 01011001010000 |
| 0 | 5 | 010110010100010 |
| 0 | 6 | 01011110001010 |
| 0 | 7 | 010110010100011 |
| 0 | 8 | 0101100001001000 |
| 0 | 9 | 0101100001001001 |
| 0 | 10 | 010111100000010 |
| 0 | 11 | 010111100000011 |
| 0 | 12 | 01011100011000 |
| 0 | 13 | 010111100000000 |
| 0 | 14 | 010111100000001 |
| 0 | 15 | 010111100000110 |
| 1 | 0 | 1 |
| 1 | 1 | 0100 |
| 1 | 2 | 010101 |
| 1 | 3 | 0101101 |
| 1 | 4 | 01011101 |
| 1 | 5 | 010110011 |
| 1 | 6 | 0101100100 |
| 1 | 7 | 01011000001 |
| 1 | 8 | 01011000111 |
| 1 | 9 | 010110000000 |
| 1 | 10 | 010111000111 |
| 1 | 11 | 0101100000010 |
| 1 | 12 | 0101100101001 |
| 1 | 13 | 0101110001101 |
| 1 | 14 | 01011000010011 |
| 1 | 15 | 010110010101 |
| 2 | 0 | 00 |
| 2 | 1 | 0111 |
| 2 | 2 | 0101001 |
| 2 | 3 | 01011111 |
| 2 | 4 | 0101100010 |
| 2 | 5 | 01011000110 |
| 2 | 6 | 010110000101 |
| 2 | 7 | 0101100000011 |
| 2 | 8 | 0101100001101 |
| 2 | 9 | 0101111000010 |
| 2 | 10 | 01011000011110 |
| 2 | 11 | 01011100011001 |
| 2 | 12 | 01011110010010 |
| 2 | 13 | 01011110010011 |
| 2 | 14 | 010111100000111 |

| | | |
|---|---|---|
| 2 | 15 | 01011000011111 |
| 3 | 0 | 0110 |
| 3 | 1 | 0101000 |
| 3 | 2 | 010111001 |
| 3 | 3 | 01011100010 |
| 3 | 4 | 010110010110 |
| 3 | 5 | 0101100001100 |
| 3 | 6 | 01011000011100 |
| 3 | 7 | 01011000011101 |
| 3 | 8 | 01011110010000 |
| 3 | 9 | 01011110010001 |
| 3 | 10 | 010111100000100 |
| 3 | 11 | 01011110010110 |
| 3 | 12 | 010111100000101 |
| 3 | 13 | 010111100011010 |
| 3 | 14 | 010111100011011 |
| 3 | 15 | 010111100011000 |
| 4 | 0 | 0101110000 |
| 4 | 1 | 0101100001000 |
| 4 | 2 | 01011110010111 |
| 4 | 3 | 010111100011001 |
| 4 | 4 | 01011110010100 |
| 4 | 5 | 010111100011110 |
| 4 | 6 | 010111100011111 |
| 4 | 7 | 010111100011100 |
| 4 | 8 | 010111100011101 |
| 4 | 9 | 010111100010010 |
| 4 | 10 | 010111100010011 |
| 4 | 11 | 01011110010101 |
| 4 | 12 | 010111100010000 |
| 4 | 13 | 010111100010001 |
| 4 | 14 | 010111100010110 |
| 4 | 15 | 010111100010111 |

Huffman Encoder Table for Class Value = 5

| Category | Run Length | Huffman Code |
|---|---|---|
|  | End-of-Block | 11000111000111 |
| 0 | 0 | 110000100 |
| 0 | 1 | 11000111001 |
| 0 | 2 | 1100001100001 |
| 0 | 3 | 11000000101101 |
| 0 | 4 | 1100011100001 |
| 0 | 5 | 110000110001100 |
| 0 | 6 | 1100011110110 |
| 0 | 7 | 11000011000111 |
| 0 | 8 | 110000110001101 |
| 0 | 9 | 110001110001100 |
| 0 | 10 | 110001110001101 |
| 0 | 11 | 110000111001010 |
| 0 | 12 | 110000111001011 |
| 0 | 13 | 11000111000100 |
| 0 | 14 | 110000111001000 |
| 0 | 15 | 110000111001001 |
| 1 | 0 | 01 |
| 1 | 1 | 1110 |
| 1 | 2 | 1100010 |
| 1 | 3 | 110000000 |
| 1 | 4 | 1100000011 |
| 1 | 5 | 11000011001 |
| 1 | 6 | 110000001000 |
| 1 | 7 | 110000110111 |
| 1 | 8 | 1100000010010 |
| 1 | 9 | 1100000010011 |
| 1 | 10 | 1100001101100 |
| 1 | 11 | 1100011101110 |
| 1 | 12 | 110000111001110 |
| 1 | 13 | 11000111000101 |
| 1 | 14 | 110000111001111 |
| 1 | 15 | 1100001101101 |
| 2 | 0 | 00 |
| 2 | 1 | 1101 |
| 2 | 2 | 11000001 |
| 2 | 3 | 110001111 |
| 2 | 4 | 11000011010 |
| 2 | 5 | 110001110110 |
| 2 | 6 | 1100011100000 |
| 2 | 7 | 1100011101111 |
| 2 | 8 | 11000011111010 |
| 2 | 9 | 11000011111011 |
| 2 | 10 | 110000111001100 |
| 2 | 11 | 110000111001101 |
| 2 | 12 | 110000111000010 |
| 2 | 13 | 11000011111000 |
| 2 | 14 | 110000111000011 |

| | | |
|---|---|---|
| 2 | 15 | 110000111000000 |
| 3 | 0 | 10 |
| 3 | 1 | 11001 |
| 3 | 2 | 110000101 |
| 3 | 3 | 11000111010 |
| 3 | 4 | 1100001100010 |
| 3 | 5 | 11000000101110 |
| 3 | 6 | 11000011111001 |
| 3 | 7 | 00011111110 |
| 3 | 8 | 110000111000001 |
| 3 | 9 | 11000011111111 |
| 3 | 10 | 110000111000110 |
| 3 | 11 | 110000111000111 |
| 3 | 12 | 110000111000100 |
| 3 | 13 | 110000111000101 |
| 3 | 14 | 110000111011010 |
| 3 | 15 | 11000011111100 |
| 4 | 0 | 1111 |
| 4 | 1 | 11000110 |
| 4 | 2 | 110000001010 |
| 4 | 3 | 11000000101111 |
| 4 | 4 | 11000111011011 |
| 4 | 5 | 110000111011000 |
| 4 | 6 | 11000011111101 |
| 4 | 7 | 110000111011001 |
| 4 | 8 | 110000111011110 |
| 4 | 9 | 11000011110010 |
| 4 | 10 | 110000111011111 |
| 4 | 11 | 110000111011100 |
| 4 | 12 | 110000111011101 |
| 4 | 13 | 110000111010010 |
| 4 | 14 | 110000111010011 |
| 4 | 15 | 11000011110011 |
| 5 | 0 | 1100001100000 |
| 5 | 1 | 11000000101100 |
| 5 | 2 | 110000111010000 |
| 5 | 3 | 110000111010001 |
| 5 | 4 | 110000111010110 |
| 5 | 5 | 110000111010111 |
| 5 | 6 | 110000111010100 |
| 5 | 7 | 11000011110000 |
| 5 | 8 | 110000111010101 |
| 5 | 9 | 110000111101010 |
| 5 | 10 | 110000111101011 |
| 5 | 11 | 110000111101000 |
| 5 | 12 | 110000111101001 |
| 5 | 13 | 11000011110001 |
| 5 | 14 | 110000111101110 |
| 5 | 15 | 110000111101111 |

Huffman Encoder Table for Class Value = 6

| Category | Run Length | Huffman Code |
|---|---|---|
|  | End-of-Block | 00110011100111 |
| 0 | 0 | 00110101 |
| 0 | 1 | 001100101001 |
| 0 | 2 | 0011001111111 |
| 0 | 3 | 0011001111010 |
| 0 | 4 | 0011001111011 |
| 0 | 5 | 001100101000100 |
| 0 | 6 | 001100011010010 |
| 0 | 7 | 001100101000101 |
| 0 | 8 | 001100111001100 |
| 0 | 9 | 001100111001101 |
| 0 | 10 | 00110010100011 |
| 0 | 11 | 001100111000110 |
| 0 | 12 | 001100111000111 |
| 0 | 13 | 001100111000100 |
| 0 | 14 | 00110011100100 |
| 0 | 15 | 001100111000101 |
| 1 | 0 | 11 |
| 1 | 1 | 00111 |
| 1 | 2 | 00110100 |
| 1 | 3 | 0011001001 |
| 1 | 4 | 00110011101 |
| 1 | 5 | 001100111110 |
| 1 | 6 | 0011001110000 |
| 1 | 7 | 00110011100101 |
| 1 | 8 | 00110011001010 |
| 1 | 9 | 001100101101010 |
| 1 | 10 | 00110011001011 |
| 1 | 11 | 001100101101011 |
| 1 | 12 | 001100101101000 |
| 1 | 13 | 001100011001000 |
| 1 | 14 | 001100101101001 |
| 1 | 15 | 00110011001001 |
| 2 | 0 | 01 |
| 2 | 1 | 00101 |
| 2 | 2 | 00110111 |
| 2 | 3 | 00110010000 |
| 2 | 4 | 001100101011 |
| 2 | 5 | 0011001010100 |
| 2 | 6 | 00110011001110 |
| 2 | 7 | 00110011001111 |
| 2 | 8 | 00110011001100 |
| 2 | 9 | 001100101101110 |
| 2 | 10 | 001100101101111 |
| 2 | 11 | 00110011001101 |
| 2 | 12 | 001100101101100 |
| 2 | 13 | 001100101101101 |
| 2 | 14 | 001100101100010 |

| | | |
|---|---|---|
| 2 | 15 | 00110011000010 |
| 3 | 0 | 10 |
| 3 | 1 | 001000 |
| 3 | 2 | 001101100 |
| 3 | 3 | 001100111100 |
| 3 | 4 | 0011001010101 |
| 3 | 5 | 001100101100011 |
| 3 | 6 | 00110011000011 |
| 3 | 7 | 001100101100000 |
| 3 | 8 | 001100101100001 |
| 3 | 9 | 001100101100110 |
| 3 | 10 | 00110011000000 |
| 3 | 11 | 001100101100111 |
| 3 | 12 | 001100101100100 |
| 3 | 13 | 001100101100101 |
| 3 | 14 | 00110011000001 |
| 3 | 15 | 001100101111010 |
| 4 | 0 | 000 |
| 4 | 1 | 0011000 |
| 4 | 2 | 00110010001 |
| 4 | 3 | 0011001010000 |
| 4 | 4 | 00110011000110 |
| 4 | 5 | 00110011000111 |
| 4 | 6 | 001100101111011 |
| 4 | 7 | 001100101111000 |
| 4 | 8 | 001100101111001 |
| 4 | 9 | 00110011000100 |
| 4 | 10 | 001100101111110 |
| 4 | 11 | 001100101111111 |
| 4 | 12 | 001100101111100 |
| 4 | 13 | 00110011000101 |
| 4 | 14 | 001100101111101 |
| 4 | 15 | 001100101110010 |
| 5 | 0 | 001001 |
| 5 | 1 | 001101101 |
| 5 | 2 | 0011001111110 |
| 5 | 3 | 00110011011010 |
| 5 | 4 | 001100101110011 |
| 5 | 5 | 001100101110000 |
| 5 | 6 | 001100101110001 |
| 5 | 7 | 00110011011011 |
| 5 | 8 | 001100101110110 |
| 5 | 9 | 001100101110111 |
| 5 | 10 | 001100101110100 |
| 5 | 11 | 00110011011000 |
| 5 | 12 | 001100101110101 |
| 5 | 13 | 001100110101010 |
| 5 | 14 | 001100110101011 |
| 5 | 15 | 00110011011001 |
| 6 | 0 | 00110011010100 |
| 6 | 1 | 001100110101001 |
| 6 | 2 | 00110011011110 |

| | | |
|---|---|---|
| 6 | 3 | 001100110101110 |
| 6 | 4 | 001100110101111 |
| 6 | 5 | 001100110101100 |
| 6 | 6 | 00110011011111 |
| 6 | 7 | 001100110101101 |
| 6 | 8 | 001100110100010 |
| 6 | 9 | 001100110100011 |
| 6 | 10 | 00110011011100 |
| 6 | 11 | 001100110100000 |
| 6 | 12 | 001100110100001 |
| 6 | 13 | 001100110100110 |
| 6 | 14 | 00110011011101 |
| 6 | 15 | 001100110100111 |

Huffman Encoder Table for Class Value = 7

| Category | Run Length | Huffman Code |
|---|---|---|
|  | End-of-Block | 000110101001001 |
| 0 | 0 | 000110100 |
| 0 | 1 | 000110110011 |
| 0 | 2 | 00011011110000 |
| 0 | 3 | 0001101100010 |
| 0 | 4 | 000110101011010 |
| 0 | 5 | 000110101011011 |
| 0 | 6 | 000110101011110 |
| 0 | 7 | 0001101010010000 |
| 0 | 8 | 000110101011111 |
| 0 | 9 | 0001101010010001 |
| 0 | 10 | 000110110001110 |
| 0 | 11 | 000100011000010 |
| 0 | 12 | 000110110001111 |
| 0 | 13 | 000100011000011 |
| 0 | 14 | 000110110001100 |
| 0 | 15 | 000110110001101 |
| 1 | 0 | 001 |
| 1 | 1 | 0001100 |
| 1 | 2 | 0001101011 |
| 1 | 3 | 000110101010 |
| 1 | 4 | 000100011000000 |
| 1 | 5 | 000100011000001 |
| 1 | 6 | 000100011000110 |
| 1 | 7 | 000100011000111 |
| 1 | 8 | 000110110101010 |
| 1 | 9 | 000100011000100 |
| 1 | 10 | 000110110101011 |
| 1 | 11 | 000100011000101 |
| 1 | 12 | 000110110101000 |
| 1 | 13 | 000110110101001 |
| 1 | 14 | 00011011101010 |
| 1 | 15 | 000110110101110 |
| 2 | 0 | 11 |
| 2 | 1 | 000111 |
| 2 | 2 | 0001000111 |
| 2 | 3 | 000110110000 |
| 2 | 4 | 00011010101100 |
| 2 | 5 | 00011011101011 |
| 2 | 6 | 000110110101111 |
| 2 | 7 | 000110110101100 |
| 2 | 8 | 00011011101000 |
| 2 | 9 | 000110110101101 |
| 2 | 10 | 00011011101001 |
| 2 | 11 | 000110110100010 |
| 2 | 12 | 000110110100011 |
| 2 | 13 | 00011011101110 |
| 2 | 14 | 000110110100000 |

| | | |
|---|---|---|
| 2 | 15 | 00011011101111 |
| 3 | 0 | 01 |
| 3 | 1 | 000101 |
| 3 | 2 | 00010001101 |
| 3 | 3 | 0001101010011 |
| 3 | 4 | 000110110100001 |
| 3 | 5 | 00011011101100 |
| 3 | 6 | 000110110100110 |
| 3 | 7 | 00011011101101 |
| 3 | 8 | 000110110100111 |
| 3 | 9 | 000110110100100 |
| 3 | 10 | 00011011100010 |
| 3 | 11 | 000110110100101 |
| 3 | 12 | 00011011100011 |
| 3 | 13 | 000110110111010 |
| 3 | 14 | 000110110111011 |
| 3 | 15 | 00011011100000 |
| 4 | 0 | 10 |
| 4 | 1 | 0001001 |
| 4 | 2 | 000100011001 |
| 4 | 3 | 00011011100001 |
| 4 | 4 | 000110110111000 |
| 4 | 5 | 00011011100110 |
| 4 | 6 | 000110110111001 |
| 4 | 7 | 000110110111110 |
| 4 | 8 | 00011011100111 |
| 4 | 9 | 000110110111111 |
| 4 | 10 | 00011011100100 |
| 4 | 11 | 000110110111100 |
| 4 | 12 | 000110110111101 |
| 4 | 13 | 00011011100101 |
| 4 | 14 | 000110110110010 |
| 4 | 15 | 000110110110011 |
| 5 | 0 | 0000 |
| 5 | 1 | 000100010 |
| 5 | 2 | 000110110010 |
| 5 | 3 | 000110110110000 |
| 5 | 4 | 00011011111010 |
| 5 | 5 | 000110110110001 |
| 5 | 6 | 000110110110110 |
| 5 | 7 | 00011011111011 |
| 5 | 8 | 000110110110111 |
| 5 | 9 | 00011011111000 |
| 5 | 10 | 000110110110100 |
| 5 | 11 | 000110110110101 |
| 5 | 12 | 00011011111001 |
| 5 | 13 | 000110111101010 |
| 5 | 14 | 00011011111110 |
| 5 | 15 | 000110111101011 |
| 6 | 0 | 00010000 |
| 6 | 1 | 000110101000 |
| 6 | 2 | 00011010100101 |

| | | |
|---|---|---|
| 6 | 3 | 000110111101000 |
| 6 | 4 | 00011011111111 |
| 6 | 5 | 000110111101001 |
| 6 | 6 | 000110111101110 |
| 6 | 7 | 00011011111100 |
| 6 | 8 | 000110111101111 |
| 6 | 9 | 00011011111101 |
| 6 | 10 | 000110111101100 |
| 6 | 11 | 000110111101101 |
| 6 | 12 | 00011011110010 |
| 6 | 13 | 000110111100010 |
| 6 | 14 | 00011011110011 |
| 6 | 15 | 000110111100011 |

Huffman Encoder Table for Class Value = 8

| Category | Run Length | Huffman Code |
|---|---|---|
|  | End-of-Block | 11010010101100 |
| 0 | 0 | 110101111 |
| 0 | 1 | 11010010010010 |
| 0 | 2 | 11010010010011 |
| 0 | 3 | 110100100000000 |
| 0 | 4 | 110100100000001 |
| 0 | 5 | 11010010011010 |
| 0 | 6 | 110100100000010 |
| 0 | 7 | 11010010011011 |
| 0 | 8 | 11010010011000 |
| 0 | 9 | 11010010011001 |
| 0 | 10 | 11010010011110 |
| 0 | 11 | 11010010011111 |
| 0 | 12 | 11010010011100 |
| 0 | 13 | 110100100000011 |
| 0 | 14 | 11010010011101 |
| 0 | 15 | 11010110110010 |
| 1 | 0 | 111 |
| 1 | 1 | 11010001 |
| 1 | 2 | 110100100001 |
| 1 | 3 | 1101001010010 |
| 1 | 4 | 110100101001110 |
| 1 | 5 | 11010110110011 |
| 1 | 6 | 11010110110000 |
| 1 | 7 | 11010110110001 |
| 1 | 8 | 11010110110110 |
| 1 | 9 | 11010110110111 |
| 1 | 10 | 11010110110100 |
| 1 | 11 | 110100101001111 |
| 1 | 12 | 11010110110101 |
| 1 | 13 | 11010010111010 |
| 1 | 14 | 11010010111011 |
| 1 | 15 | 11010010111000 |
| 2 | 0 | 001 |
| 2 | 1 | 1101010 |
| 2 | 2 | 11010010001 |
| 2 | 3 | 1101001001000 |
| 2 | 4 | 11010010111001 |
| 2 | 5 | 110100101001100 |
| 2 | 6 | 11010010111110 |
| 2 | 7 | 11010010111111 |
| 2 | 8 | 11010010111100 |
| 2 | 9 | 11010010111101 |
| 2 | 10 | 11010010110010 |
| 2 | 11 | 11010010110011 |
| 2 | 12 | 110100101001101 |
| 2 | 13 | 11010010110000 |
| 2 | 14 | 11010010110001 |

| | | |
|---|---|---|
| 2 | 15 | 11010010110110 |
| 3 | 0 | 10 |
| 3 | 1 | 110110 |
| 3 | 2 | 11010110111 |
| 3 | 3 | 11010010110111 |
| 3 | 4 | 11010010110100 |
| 3 | 5 | 11010010110101 |
| 3 | 6 | 11010110001010 |
| 3 | 7 | 11010110001011 |
| 3 | 8 | 110100101000010 |
| 3 | 9 | 11010110001000 |
| 3 | 10 | 11010110001001 |
| 3 | 11 | 11010110001110 |
| 3 | 12 | 11010110001111 |
| 3 | 13 | 11010110001100 |
| 3 | 14 | 11010110001101 |
| 3 | 15 | 110100101000011 |
| 4 | 0 | 01 |
| 4 | 1 | 110111 |
| 4 | 2 | 1101001000001 |
| 4 | 3 | 110100101000000 |
| 4 | 4 | 11010110000010 |
| 4 | 5 | 11010110000011 |
| 4 | 6 | 11010110000000 |
| 4 | 7 | 11010110000001 |
| 4 | 8 | 11010110000110 |
| 4 | 9 | 11010110000111 |
| 4 | 10 | 110100101000001 |
| 4 | 11 | 11010110000100 |
| 4 | 12 | 11010110000101 |
| 4 | 13 | 11010110011010 |
| 4 | 14 | 11010110011011 |
| 4 | 15 | 11010110011000 |
| 5 | 0 | 000 |
| 5 | 1 | 11010000 |
| 5 | 2 | 1101001001010 |
| 5 | 3 | 11010110011001 |
| 5 | 4 | 11010110011110 |
| 5 | 5 | 11010110011111 |
| 5 | 6 | 110100101000110 |
| 5 | 7 | 11010110011100 |
| 5 | 8 | 11010110011101 |
| 5 | 9 | 11010110010010 |
| 5 | 10 | 11010110010011 |
| 5 | 11 | 11010110010000 |
| 5 | 12 | 11010110010001 |
| 5 | 13 | 110100101000111 |
| 5 | 14 | 11010110010110 |
| 5 | 15 | 11010110010111 |
| 6 | 0 | 1100 |
| 6 | 1 | 110101110 |
| 6 | 2 | 11010110010100 |

| | | |
|---|---|---|
| 6 | 3 | 11010110010101 |
| 6 | 4 | 11010110101010 |
| 6 | 5 | 11010110101011 |
| 6 | 6 | 110100101000100 |
| 6 | 7 | 11010110101000 |
| 6 | 8 | 11010110101001 |
| 6 | 9 | 11010110101110 |
| 6 | 10 | 11010110101111 |
| 6 | 11 | 11010110101100 |
| 6 | 12 | 11010110101101 |
| 6 | 13 | 110100101000101 |
| 6 | 14 | 11010110100010 |
| 6 | 15 | 11010110100011 |
| 7 | 0 | 11010011 |
| 7 | 1 | 1101001001011 |
| 7 | 2 | 11010110100000 |
| 7 | 3 | 11010110100001 |
| 7 | 4 | 11010110100110 |
| 7 | 5 | 110100101011010 |
| 7 | 6 | 11010110100111 |
| 7 | 7 | 11010110100100 |
| 7 | 8 | 11010110100101 |
| 7 | 9 | 11010010101010 |
| 7 | 10 | 11010010101011 |
| 7 | 11 | 11010010101000 |
| 7 | 12 | 110100101011011 |
| 7 | 13 | 11010010101001 |
| 7 | 14 | 11010010101110 |
| 7 | 15 | 11010010101111 |

Huffman Encoder Table for Class Value = 9

| Category | Run Length | Huffman Code |
|---|---|---|
| | End-of-Block | 00101000100011 |
| 0 | 0 | 001011110011 |
| 0 | 1 | 00101000100110 |
| 0 | 2 | 00101000100111 |
| 0 | 3 | 00101011011000 |
| 0 | 4 | 00101011011001 |
| 0 | 5 | 00101000101110 |
| 0 | 6 | 00101011011011 |
| 0 | 7 | 00101000101111 |
| 0 | 8 | 00101000101100 |
| 0 | 9 | 00101000101101 |
| 0 | 10 | 00101011010010 |
| 0 | 11 | 00101011010011 |
| 0 | 12 | 00101011010000 |
| 0 | 13 | 00101011010001 |
| 0 | 14 | 00101011010110 |
| 0 | 15 | 00101011010111 |
| 1 | 0 | 00100 |
| 1 | 1 | 001011111 |
| 1 | 2 | 0010111100101 |
| 1 | 3 | 00101011010100 |
| 1 | 4 | 00101011010101 |
| 1 | 5 | 00101010001010 |
| 1 | 6 | 00101010001011 |
| 1 | 7 | 00101010001000 |
| 1 | 8 | 00101010001001 |
| 1 | 9 | 00101010001110 |
| 1 | 10 | 00101010001111 |
| 1 | 11 | 00101010001100 |
| 1 | 12 | 00101010001101 |
| 1 | 13 | 00101010000010 |
| 1 | 14 | 00101010000011 |
| 1 | 15 | 00101010000000 |
| 2 | 0 | 011 |
| 2 | 1 | 001010111 |
| 2 | 2 | 00101010000001 |
| 2 | 3 | 0010111100100 |
| 2 | 4 | 00101010000110 |
| 2 | 5 | 00101010000111 |
| 2 | 6 | 00101010000100 |
| 2 | 7 | 00101010000101 |
| 2 | 8 | 00101010011010 |
| 2 | 9 | 00101010011011 |

| | | |
|---|---|---|
| 2 | 10 | 00101010011000 |
| 2 | 11 | 00101010011001 |
| 2 | 12 | 00101010011110 |
| 2 | 13 | 001010001000000 |
| 2 | 14 | 00101010011111 |
| 2 | 15 | 00101010011100 |
| 3 | 0 | 11 |
| 3 | 1 | 00101001 |
| 3 | 2 | 001010110111 |
| 3 | 3 | 001010001000001 |
| 3 | 4 | 00101010011101 |
| 3 | 5 | 00101010010010 |
| 3 | 6 | 00101010010011 |
| 3 | 7 | 00101010010000 |
| 3 | 8 | 00101010010001 |
| 3 | 9 | 00101010010110 |
| 3 | 10 | 00101010010111 |
| 3 | 11 | 00101010010100 |
| 3 | 12 | 00101010010101 |
| 3 | 13 | 00101010101010 |
| 3 | 14 | 00101010101011 |
| 3 | 15 | 00101010101000 |
| 4 | 0 | 10 |
| 4 | 1 | 0010110 |
| 4 | 2 | 0010100010010 |
| 4 | 3 | 00101010101001 |
| 4 | 4 | 00101010101110 |
| 4 | 5 | 00101010101111 |
| 4 | 6 | 00101010101100 |
| 4 | 7 | 00101010101101 |
| 4 | 8 | 00101010100010 |
| 4 | 9 | 00101010100011 |
| 4 | 10 | 00101010100000 |
| 4 | 11 | 00101010100001 |
| 4 | 12 | 00101010100110 |
| 4 | 13 | 00101010100111 |
| 4 | 14 | 001010001000100 |
| 4 | 15 | 00101010100100 |
| 5 | 0 | 000 |
| 5 | 1 | 00101110 |
| 5 | 2 | 00101010100101 |
| 5 | 3 | 00101010111010 |
| 5 | 4 | 00101010111011 |
| 5 | 5 | 00101010111000 |
| 5 | 6 | 00101010111001 |
| 5 | 7 | 00101010111110 |

| | | |
|---|---|---|
| 5 | 8 | 00101010111111 |
| 5 | 9 | 00101010111100 |
| 5 | 10 | 00101010111101 |
| 5 | 11 | 001010001000101 |
| 5 | 12 | 00101010110010 |
| 5 | 13 | 00101010110011 |
| 5 | 14 | 00101010110000 |
| 5 | 15 | 00101010110001 |
| 6 | 0 | 010 |
| 6 | 1 | 001010000 |
| 6 | 2 | 00101010110110 |
| 6 | 3 | 00101010110111 |
| 6 | 4 | 00101010110100 |
| 6 | 5 | 00101010110101 |
| 6 | 6 | 00101011001010 |
| 6 | 7 | 00101011001011 |
| 6 | 8 | 00101011001000 |
| 6 | 9 | 00101011001001 |
| 6 | 10 | 00101011001110 |
| 6 | 11 | 00101011001111 |
| 6 | 12 | 00101011001100 |
| 6 | 13 | 00101011001101 |
| 6 | 14 | 00101011000010 |
| 6 | 15 | 00101011000011 |
| 7 | 0 | 0011 |
| 7 | 1 | 00101111000 |
| 7 | 2 | 00101011000000 |
| 7 | 3 | 00101011000001 |
| 7 | 4 | 00101011000110 |
| 7 | 5 | 00101011000111 |
| 7 | 6 | 00101011000100 |
| 7 | 7 | 00101011000101 |
| 7 | 8 | 00101000111010 |
| 7 | 9 | 00101000111011 |
| 7 | 10 | 00101000111000 |
| 7 | 11 | 00101000111001 |
| 7 | 12 | 00101000111110 |
| 7 | 13 | 001010001000010 |
| 7 | 14 | 00101000111111 |
| 7 | 15 | 00101000111100 |
| 8 | 0 | 0010111101 |
| 8 | 1 | 00101000111101 |
| 8 | 2 | 00101000110010 |
| 8 | 3 | 00101000110011 |
| 8 | 4 | 00101000110000 |
| 8 | 5 | 001010001000011 |
| 8 | 6 | 00101000110001 |
| 8 | 7 | 00101000110110 |
| 8 | 8 | 00101000110111 |
| 8 | 9 | 00101000110100 |
| 8 | 10 | 00101000110101 |
| 8 | 11 | 00101000101010 |

| | | |
|---|---|---|
| 8 | 12 | 00101000101011 |
| 8 | 13 | 00101000101000 |
| 8 | 14 | 00101000101001 |
| 8 | 15 | 00101011011010 |

Huffman Encoder Table for Class Value = 10

| Category | Run Length | Huffman Code |
|---|---|---|
|  | End-of-Block | 000011101010 |
| 0 | 0 | 00011110011 |
| 0 | 1 | 000011101011 |
| 0 | 2 | 000111100100 |
| 0 | 3 | 000011000100 |
| 0 | 4 | 000111100101 |
| 0 | 5 | 000110000010 |
| 0 | 6 | 000110000011 |
| 0 | 7 | 000011000101 |
| 0 | 8 | 000110000000 |
| 0 | 9 | 000110000001 |
| 0 | 10 | 000011101000 |
| 0 | 11 | 000110000110 |
| 0 | 12 | 000110000111 |
| 0 | 13 | 000011101001 |
| 0 | 14 | 000110000100 |
| 0 | 15 | 000110000101 |
| 1 | 0 | 00010 |
| 1 | 1 | 000011001010 |
| 1 | 2 | 000110011010 |
| 1 | 3 | 000110011011 |
| 1 | 4 | 000011001011 |
| 1 | 5 | 000110011000 |
| 1 | 6 | 000110011001 |
| 1 | 7 | 000011001000 |
| 1 | 8 | 000110011110 |
| 1 | 9 | 000110011111 |
| 1 | 10 | 000110011100 |
| 1 | 11 | 000011001001 |
| 1 | 12 | 000110011101 |
| 1 | 13 | 000110010010 |
| 1 | 14 | 000011001110 |
| 1 | 15 | 000110010011 |
| 2 | 0 | 00000 |
| 2 | 1 | 000111101 |
| 2 | 2 | 000110010000 |
| 2 | 3 | 000110010001 |
| 2 | 4 | 000011001111 |
| 2 | 5 | 000110010110 |
| 2 | 6 | 000110010111 |
| 2 | 7 | 000110010100 |
| 2 | 8 | 000011001100 |
| 2 | 9 | 000110010101 |
| 2 | 10 | 000110101010 |

| | | |
|---|---|---|
| 2 | 11 | 000011001101 |
| 2 | 12 | 000110101011 |
| 2 | 13 | 000110101000 |
| 2 | 14 | 000011100010 |
| 2 | 15 | 000110101001 |
| 3 | 0 | 010 |
| 3 | 1 | 000111110 |
| 3 | 2 | 000110101110 |
| 3 | 3 | 000110101111 |
| 3 | 4 | 000011100011 |
| 3 | 5 | 000110101100 |
| 3 | 6 | 000110101101 |
| 3 | 7 | 000011100000 |
| 3 | 8 | 000110100010 |
| 3 | 9 | 000110100011 |
| 3 | 10 | 000110100000 |
| 3 | 11 | 000011100001 |
| 3 | 12 | 000110100001 |
| 3 | 13 | 000110100110 |
| 3 | 14 | 000011100110 |
| 3 | 15 | 000110100111 |
| 4 | 0 | 11 |
| 4 | 1 | 00001111 |
| 4 | 2 | 000110100100 |
| 4 | 3 | 000011100111 |
| 4 | 4 | 000110100101 |
| 4 | 5 | 000110111010 |
| 4 | 6 | 000011100100 |
| 4 | 7 | 000110111011 |
| 4 | 8 | 000110111000 |
| 4 | 9 | 000110111001 |
| 4 | 10 | 000011100101 |
| 4 | 11 | 000110111110 |
| 4 | 12 | 000110111111 |
| 4 | 13 | 000011011010 |
| 4 | 14 | 000110111100 |
| 4 | 15 | 000110111101 |
| 5 | 0 | 10 |
| 5 | 1 | 00011101 |
| 5 | 2 | 000110110010 |
| 5 | 3 | 000011011011 |
| 5 | 4 | 000110110011 |
| 5 | 5 | 000110110000 |
| 5 | 6 | 000110110001 |
| 5 | 7 | 000011011000 |
| 5 | 8 | 000110110110 |
| 5 | 9 | 000110110111 |

| | | |
|---|---|---|
| 5 | 10 | 000011011001 |
| 5 | 11 | 000110110100 |
| 5 | 12 | 000110110101 |
| 5 | 13 | 000011011110 |
| 5 | 14 | 000111001010 |
| 5 | 15 | 000111001011 |
| 6 | 0 | 001 |
| 6 | 1 | 000111111 |
| 6 | 2 | 000111001000 |
| 6 | 3 | 000111001001 |
| 6 | 4 | 000011011111 |
| 6 | 5 | 000111001110 |
| 6 | 6 | 000111001111 |
| 6 | 7 | 000011011100 |
| 6 | 8 | 000111001100 |
| 6 | 9 | 000111001101 |
| 6 | 10 | 000111000010 |
| 6 | 11 | 000011011101 |
| 6 | 12 | 000111000011 |
| 6 | 13 | 000111000000 |
| 6 | 14 | 000011010010 |
| 6 | 15 | 000111000001 |
| 7 | 0 | 011 |
| 7 | 1 | 0000110000 |
| 7 | 2 | 000111000110 |
| 7 | 3 | 000011010011 |
| 7 | 4 | 000111000111 |
| 7 | 5 | 000111000100 |
| 7 | 6 | 000111000101 |
| 7 | 7 | 000011010000 |
| 7 | 8 | 000110001010 |
| 7 | 9 | 000110001011 |
| 7 | 10 | 000011010001 |
| 7 | 11 | 000110001000 |
| 7 | 12 | 000110001001 |
| 7 | 13 | 000011010110 |
| 7 | 14 | 000110001110 |
| 7 | 15 | 000110001111 |
| 8 | 0 | 000010 |
| 8 | 1 | 000011010111 |
| 8 | 2 | 000110001100 |
| 8 | 3 | 000110001101 |
| 8 | 4 | 000011010100 |
| 8 | 5 | 000111100010 |
| 8 | 6 | 000111100011 |
| 8 | 7 | 000011010101 |
| 8 | 8 | 000111100000 |
| 8 | 9 | 000111100001 |
| 8 | 10 | 000011101110 |
| 8 | 11 | 000011000110 |
| 8 | 12 | 000011101111 |
| 8 | 13 | 000011101100 |

8            14        000011000111

What is claimed is:

1. A method of transmitting a digital signal which includes frames of frequency coefficients arranged in bands that each include multiple frequency coefficients, the method comprising for each frame the steps of:

generating a spectral estimate of energy in each band based on the plurality of frequency coefficients included in the band, generating a step size for each frequency coefficient based on the spectral estimate for the band in which the frequency coefficient is included, the step size for a first frequency coefficient in a first band having relatively higher energy being larger than the step size for a second frequency coefficient in a second band having relatively lower energy, generating a class value for each of said bands that corresponds to energy in said band relative to average energy in other bands in the frame, quantizing said frequency coefficients based on a relationship between a value of the frequency coefficient being quantized, a class value generated for the band that includes the frequency coefficient being quantized, and a step size generated for the frequency coefficient being quantized to produce quantized frequency coefficients, encoding said quantized frequency coefficients based on said class values to produce encoded quantized frequency coefficients, wherein the encoded quantized frequency coefficients are represented by a number of bits that is related to the class values, determining whether the number of bits that represent the encoded quantized frequency coefficients differs from a threshold value, iteratively modifying the class values and repeating said steps of generating a step size, quantizing said frequency coefficients, and encoding said quantized frequency coefficients when the number of bits that represent the encoded quantized frequency coefficients differs from the threshold value, and transmitting said encoded quantized frequency coefficients.

2. The method of claim 1 wherein said step of encoding said quantized frequency coefficients comprises using entropy coding in which consecutive quantized frequency coefficients having values of zero are jointly encoded.

3. The method of claim 1 wherein said quantized frequency coefficients are not generated or transmitted for bands having a class value of zero.

4. The method of claim 1, said method further including, when said number of bits exceeds a predetermined threshold, the step of reducing said number of bits so that said number of bits is less than or equal to said predetermined threshold by eliminating certain of said encoded quantized frequency coefficients, said eliminated encoded quantized frequency coefficients not being transmitted in said transmitting step.

5. The method of claim 4, wherein each of said frequency coefficients represents a different frequency, and said reducing step includes eliminating encoded quantized frequency coefficients that represent the highest frequencies.

* * * * *